US006590532B1

(12) United States Patent
Ogawa et al.

(10) Patent No.: US 6,590,532 B1
(45) Date of Patent: Jul. 8, 2003

(54) RADIO DEVICE

(75) Inventors: Yasutaka Ogawa, Sapporo (JP); Takeo Ohgane, Sapporo (JP); Yoshiharu Doi, Gifu (JP)

(73) Assignees: Japan as represented by President of Hokkaido University, Sapporo (JP); Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/926,769

(22) PCT Filed: Jun. 22, 2000

(86) PCT No.: PCT/JP00/04086
§ 371 (c)(1),
(2), (4) Date: Dec. 18, 2001

(87) PCT Pub. No.: WO00/79702
PCT Pub. Date: Dec. 28, 2000

(30) Foreign Application Priority Data

Jun. 23, 1999 (JP) ............................................. 11-177398

(51) Int. Cl.[7] .............................. G01S 3/16; H04B 1/06; H04B 7/00
(52) U.S. Cl. ..................... 342/378; 342/372; 455/276.1; 455/277.1
(58) Field of Search ................................ 342/378, 372; 455/276.1–278.1, 303–305

(56) References Cited

FOREIGN PATENT DOCUMENTS

| EP | 0 869 577 | 10/1998 |
| JP | 8-274687 | 10/1996 |
| JP | 10-70494 | 3/1998 |
| JP | 10-285092 | 10/1998 |
| JP | 10-313472 | 11/1998 |
| JP | 10-336087 | 12/1998 |
| JP | 2000-22612 | 1/2000 |
| JP | 2000-224097 | 8/2000 |
| WO | WO98/56121 | 12/1998 |

OTHER PUBLICATIONS

B. Widrow et al., Proceedings of the IEEE, vol. 55, No. 12, pp. 2143–2159, Dec. 1967. Cited in the specification.
S. P. Applebaum; IEEE Trans. Antennas & Propagation, vol. AP–24, No. 5, pp. 585–598, Sep. 1976. Cited in the specification.
B. Widrow et al.; Adaptive Signal Processing, Chapter 6, pp. 99–116; 1995. Cited in the specification.
R. Monzingo et al.; A Wiley–Interscience Pub.; Chapter 3, pp. 78–105. 1980. Cited in the spec.
R. T. Compton, Jr., Prentice Hall, Section 2, pp. 6–11. Cited in the specification.
E. Nicolau et al; Elsevier; Chapter 8, pp. 122–163, 1989. Cited in the specification.
J. E. Hudson; IEE Electromagnetic Waves Series II, Chapter 3, pp. 59–154. Cited in the specification.

Primary Examiner—Thomas H. Tarcza
Assistant Examiner—Fred Mull
(74) Attorney, Agent, or Firm—Armstrong, Westerman & Hattori, LLP

(57) ABSTRACT

A radio equipment 1000 separates a signal of a specific terminal from signals from adaptive array antennas #1 to #4, based on a reception weight vector calculated by a reception weight vector calculator 20. Reception coefficient vector calculator 22 provides an impulse response of a signal propagation path of the specific terminal. A transmission coefficient vector estimator 32 predicts a propagation path at the time of transmission, from the result of estimation by the reception coefficient vector calculator 22. The transmission weight vector calculator 30 controls, based on the result of prediction by the transmission coefficient vector estimator 32, the antenna directivity at the time of transmission. Thus, degradation of error rate of the down link generated by the time difference between up/down links can be suppressed.

18 Claims, 30 Drawing Sheets

PREDICTION ERROR
(WHITE GAUSS NOISE)

$$W(Z) = \frac{1}{A(Z)}$$

RADIO DEVICE

TECHNICAL FIELD

The present invention relates to a configuration of a radio equipment capable of changing antenna directivity on real time basis, and particularly to a configuration of a radio equipment used in an adaptive array radio base station.

BACKGROUND ART

Recently, various methods of transmission channel allocation have been proposed to realize effective use of frequency, in a mobile communication system, of which some have been practically implemented.

FIG. 30 shows an arrangement of channels in various communication systems including frequency division multiple access (FDMA), time division multiple access (TDMA) and path division multiple access (PDMA).

Referring to FIG. 30, FDMA, TDMA and PDMA will be briefly described. FIG. 30(a) represents FDMA in which analog signals of users 1 to 4 are subjected to frequency division and transmitted over radio waves of different frequencies f1 to f4, and the signals of respective users 1 to 4 are separated by frequency filters.

In TDMA shown in FIG. 30(b), digitized signals of respective users are transmitted over the radio waves having different frequencies f1 to f4 and time-divided time slot by time slot (time slot: a prescribed time period), and the signals of respective users are separated by the frequency filters and time-synchronization between a base station and mobile terminals of respective users.

Recently, PDMA method has been proposed to improve efficiency of use of radio frequency, as portable telephones have come to be widely used. In the PDMA method, one time slot of one frequency is spatially divided to enable transmission of data of a plurality of users, as shown in FIG. 30(c). In the PDMA, signals of respective users are separated by the frequency filters, the time synchronization between the base station and the mobile terminals of respective users, and a mutual interference eliminating apparatus such as an adaptive array.

The operation principle of such an adaptive array radio base station is described in the following literature, for example:

B. Widrow, et al.: "Adaptive Antenna Systems", Proc. IEEE, vol.55, No.12, pp.2143–2159 (December 1967).

S. P. Applebaum: "Adaptive Arrays", IEEE Trans. Antennas & Propag., vol.AP-24, No.5, pp.585–598 (September 1976).

O. L. Frost, III: "Adaptive Least Squares Optimization Subject to Linear Equality Constraints", SEL-70-055, Technical Report, No.6796-2, Information System Lab., Stanford Univ. (August 1970).

B. Widrow and S. D. Stearns: "Adaptive Signal Processing", Prentice-Hall, Englewood Cliffs (1985).

R. A. Monzingo and T. W. Miller: "Introduction to Adaptive Arrays", John Wiley & Sons, New York (1980).

J. E. Hudson: "Adaptive Array Principles", Peter Peregrinus Ltd., London (1981).

R. T. Compton, Jr.: "Adaptive Antennas—Concepts and Performance", Prentice-Hall, Englewood Cliffs (1988).

E. Nicolau and D. Zaharia: "Adaptive Arrays", Elsevier, Amsterdam (1989).

FIG. 31 is a model diagram conceptually showing the operation principle of such an adaptive array radio base station. Referring to FIG. 31, an adaptive array radio base station 1 includes an array antenna 2 formed by n antennas #1, #2, #3, . . . , #n, and a first hatched area 3 shows a range in which radio waves from the array antenna 2 can be received. A second hatched area 7 shows a range in which radio waves from adjacent another radio base station 6 can be received.

In the area 3, the adaptive array radio base station 1 transmits/receives a radio signal to/from a portable telephone 4 forming a terminal of a user A (arrow 5). In the area 7, the radio base station 6 transmits/receives a radio signal to/from a portable telephone 8 forming a terminal of another user B (arrow 9).

When the radio signal for the portable telephone 4 of the user A happens to be equal in frequency to the radio signal for the portable telephone 8 of the user B, it follows that the radio signal from the portable telephone 8 of the user B serves as an unnecessary interference signal in the area 3 depending on the position of the user B, to disadvantageously mix into the radio signal transmitted between the portable telephone 4 of the user A and the adaptive array radio base station 1.

In this case, it follows that the adaptive array radio base station 1 receiving the mixed radio signals from both users A and B in the aforementioned manner outputs the signals from the users A and B in a mixed state unless some necessary processing is performed, to disadvantageously hinder communication with the regular user A.

[Configuration and Operation of Conventional Adaptive Array Antenna]

In order to eliminate the signal from the user B from the output signal, the adaptive array radio base station 1 performs the following processing. FIG. 32 is a schematic block diagram showing the configuration of the adaptive array radio base station 1.

Assuming that A(t) represents the signal from the user A and B(t) represents the signal from the user B, a signal x1(t) received in the first antenna #1 forming the array antenna 2 shown in FIG. 31 is expressed as follows:

$$x1(t)=a1 \times A(t)+b1 \times B(t)$$

where a1 and b1 represent coefficients changing in real time, as described later.

A signal x2(t) received in the second antenna #2 is expressed as follows:

$$x2(t)=a2 \times A(t)+b2 \times B(t)$$

where a2 and b2 also represent coefficients changing in real time.

A signal x3(t) received in the third antenna #3 is expressed as follows:

$$x3(t)=a3 \times A(t)+b3 \times B(t)$$

where a3 and b3 also represent coefficients changing in real time.

Similarly, a signal xn(t) received in the n-th antenna #n is expressed as follows:

$$xn(t)=an \times A(t)+bn \times B(t)$$

where an and bn also represent coefficients changing in real time.

The above coefficients a1, a2, a3, . . . , an show that the antennas #1, #2, #3, . . . , #n forming the array antenna 2 are different in receiving strength from each other with respect to the radio signal from the user A since the relative positions of the antennas #1, #2, #3, . . . , #n are different from each other (the antennas #1, #2, #3, . . . , #n are arranged at intervals about five times the wavelength of the radio signal, i.e., about 1 m, from each other).

The above coefficients b1, b2, b3, . . . , bn also show that the antennas #1, #2, #3, . . . , #n are different in receiving strength from each other with respect to the radio signal from the user B. The users A and B are moving and hence these coefficients a1, a2, a3, an and b1, b2, b3, . . . , bn change in real time.

The signals x1(t), x2(t), x3(t), . . . , xn(t) received in the respective antennas #1, #2, #3, . . . , #n are input to a receiving unit 1R forming the adaptive array radio base station 1 through corresponding switches 10-1, 10-2, 10-3, . . . , 10-n respectively so that the received signals are supplied to a weight vector control unit 11 and to one input of each of the corresponding multipliers 12-1, 12-2, 12-3, . . . , 12-n respectively.

Weights w1, w2, w3, . . . , wn for the signals x1(t), x2(t), x3(t), . . . , xn(t) received in the antennas #1, #2, #3, . . . , #n are applied from the weight vector control unit 11 to other inputs of these multipliers 12-1, 12-2, 12-3, . . . , 12-n respectively. The weight vector control unit 11 calculates these weights w1, w2, w3, . . . , wn in real time, as described later.

Therefore, the signal x1(t) received in the antenna #1 is converted to w1×(a1A(t)+b1B(t)) through the multiplier 12-1, the signal x2(t) received in the antenna #2 is converted to w2×(a2A(t)+b2B(t)) through the multiplier 12-2, the signal x3(t) received in the antenna #3 is converted to w3×(a3A(t)+b3B(t)) through the multiplier 12-3, and the signal xn(t) received in the antenna #n is converted to wn×(anA(t)+bnB(t)) through the multiplier 12-n.

An adder 13 adds the outputs of these multipliers 12-1, 12-2, 12-3, . . . , 12-n, and outputs the following signal:

$$w1(a1A(t)+b1B(t))+w2(a2A(t)+b2B(t))+w3(a3A(t)+b3B(t))+ \ldots +wn(anA(t)+bnB(t))$$

This expression is classified into terms related to the signals A(t) and B(t) respectively as follows:

$$(w1a1+w2a2+w3a3+ \ldots +wnan)A(t)+(w1b1+w2b2+w3b3+ \ldots +wnbn)B(t)$$

As described later, the adaptive array radio base station 1 identifies the users A and B and calculates the aforementioned weights w1, w2, w3, . . . , wn to be capable of extracting only the signal from the desired user. Referring to FIG. 32, for example, the weight vector control unit 11 regards the coefficients a1, a2, a3, . . . , an and b1, b2, b3, . . . , bn as constants and calculates the weights w1, w2, w3, . . . , wn so that the coefficients of the signals A(t) and B(t) are 1 and 0 as a whole respectively, in order to extract only the signal A(t) from the intended user A for communication.

In other words, the weight vector control unit 11 solves the following simultaneous linear equations, thereby calculating the weights w1, w2, w3, . . . , wn on real time basis so that the coefficients of the signals A(t) and B(t) are 1 and 0 respectively:

$$w1a1+w2a2+w3a3+ \ldots +wnan=1$$

$$w1b1+w2b2+w3b3+ \ldots +wnbn=0$$

The method of solving the above simultaneous linear equations, not described in this specification, is known as described in the aforementioned literature and already put into practice in an actual adaptive array radio base station.

When setting the weights w1, w2, w3, . . . , wn in the aforementioned manner, the adder 13 outputs the following signal:

$$\text{output signal}=1 \times A(t)+0 \times B(t)=A(t)$$

[User Identification, Training Signal]

The aforementioned users A and B are identified as follows:

FIG. 33 is a schematic diagram showing the frame structure of a radio signal for a portable telephone set. The radio signal for the portable telephone set is roughly formed by a preamble consisting of a signal sequence known to the radio base station and data (sound etc.) consisting of a signal sequence unknown to the radio base station.

The signal sequence of the preamble includes a signal sequence of information for recognizing whether or not the user is a desired user for making communication with the radio base station. The weight vector control unit 11 (FIG. 32) of the adaptive array radio base station 1 compares a training signal corresponding to the user A fetched from a memory 14 with the received signal sequence and performs weight vector control (decision of weights) for extracting a signal apparently including the signal sequence corresponding to the user A. The adaptive array radio base station 1 outputs the signal from the user A extracted in the aforementioned manner as an output signal $S_{RX}(t)$.

Referring again to FIG. 32, an external input signal $S_{TX}(t)$ is input to a transmission unit 1T forming the adaptive array radio base station 1 and supplied to one input of each of multipliers 15-1, 15-2, 15-3, . . . , 15-n. The weights w1, w2, w3, . . . , wn previously calculated by the weight vector control unit 11 on the basis of the received signal are copied and applied to other inputs of these multipliers 15-1, 15-2, 15-3, . . . , 15-n respectively.

The input signals $S_{TX}(t)$ weighted by these multipliers 15-1, 15-2, 15-3, . . . , 15-n are sent to the corresponding antennas #1, #2, #3, . . . , #n through corresponding switches 10-1, 10-2, 10-3, . . . , 10-n respectively, and transmitted into the area 3 shown in FIG. 31.

The signal transmitted through the same array antenna 2 as that in receiving is weighted for the target user A similarly to the received signal, and hence the portable telephone set 4 of the user A receives the transmitted radio signal as if the signal has directivity to the user A. FIG. 34 images such transfer of a radio signal between the user A and the adaptive array radio base station 1. Imaged is such a state that the adaptive array radio base station 1 transmits the radio signal with directivity toward the target portable telephone set 4 of the user A as shown in a virtual area 3a in FIG. 34 in contrast with the area 3 of FIG. 31 showing the range actually receiving radio waves.

As described above, in the PDMA method, a technique is necessary to remove co-channel interference. In this point, an adaptive array that places nulls on the interfering waves adaptively is an effective means, as it can effectively suppress the interfering wave even when the level of the interfering wave is higher than the level of the desired wave.

When an adaptive array is used for a base station, it becomes possible not only to remove interference at the time of reception but also to reduce unnecessary radiation at the time of transmission.

At this time, an array pattern at the time of transmission may be an array pattern for reception, or the array pattern may be newly generated based on a result of incoming direction estimation, for example. The latter method is applicable no matter whether FDD (Frequency Division Duplex) or TDD (Time Division Duplex) is used. It requires, however, a complicated process. When the former approach is to be used while FDD is utilized, modification of the array arrangement or weight becomes necessary, as the array patterns for transmission and reception are different. Therefore, generally, application is on the premise that TDD is utilized, and in an environment where external slots are continuous, satisfactory characteristic has been ensured.

As described above, in the TDD/PDMA method using an adaptive array in the base station, when an array pattern (weight vector pattern) obtained for the up link is used for the down link, transmission directivity may possibly be degraded in the down link because of time difference between the up and down links, assuming a dynamic Rayleigh propagation degree with angular spread.

More specifically, there is a time interval from transmission of the radiowave from a user terminal to the base station through the up link until radiowave is emitted from the base station to the user terminal through the down link. Therefore, if the speed of movement of the user terminal is not negligible, transmission directivity degrades because of the difference between the direction of radiowave emission from the base station and the actual direction of the user terminal.

As a method of estimating weight for the down link considering such a variation in the propagation path, a method of performing first order extrapolation utilizing a weight vector value obtained in the up link has been proposed in the following articles.

(1) Kato, Ohgane, Ogawa, Itoh, Proc. of the Institute of Electronics, Information and Communication Engineers (B-II), vol. J81-B-II, No. 1, pp. 1–9, January 1998.

(2) Doi, Ohgane, Karasawa, Technical Report of the Institute of Electronics, Information and Communication Engineers, RCS97-68, pp.27–32, July 1997.

However, when time change of the weight is actually monitored, it is not linear, and therefore, the conventional method utilizing the first order extrapolation of the weight vector results in a large error.

The present invention was made to solve the above described problem, and an object is to provide a radio equipment in which, based on the finding that weight of the adaptive array can be uniquely represented by the response vector of each antenna element, time change of the response vector is estimated so as to indirectly estimate the weight, whereby degradation of error rate in the down link generated from time difference between up and down links can be suppressed even in the TDD/PDMA systems, assuming a dynamic Rayleigh propagation path with angular spread.

DISCLOSURE OF THE INVENTION

The present invention provides a radio equipment changing antenna directivity on real time basis and transmitting/receiving signals to/from a plurality of terminals by time division of the signal into a plurality of slots, including: a plurality of antennas arranged in a discrete manner; and a transmission circuit and a reception circuit sharing the plurality of antennas for transmitting/receiving signals; wherein the reception circuit includes a reception signal separating circuit for separating a signal from a specific terminal among the plurality of terminals, based on signals from the plurality of antennas, when a reception signal is received, and a reception propagation path estimating circuit estimating a propagation path from the specific terminal based on signals from the plurality of antennas, when the reception signal is received; the transmission circuit includes a transmission propagation path estimating circuit predicting a propagation path when a transmission signal is transmitted, based on a result of estimation by the reception propagation path estimating circuit, and a transmission directivity control circuit updating the antenna directivity when the transmission signal is transmitted, based on the result of estimation by the transmission propagation path estimating circuit; wherein each slot includes a first data area of a first prescribed size provided in the slot so as to distinguish transmission/reception to/from the specific terminal, and a second data area of a second prescribed size provided in an area succeeding and apart by a prescribed interval from the first data area, in the slot to distinguish transmission/reception to/from the specific terminal; the reception propagation path estimating circuit provides the first estimation value and a second estimation value of the specific terminal based on data in the first and second data areas, respectively; and the transmission propagation path estimating circuit predicts propagation path when the transmission signal is transmitted, by extrapolating the first and second estimation values.

The radio equipment corresponds to the configuration of the radio equipment as described above and, in addition, the first data area includes a first training data area, and the second data area includes a second training data area.

The radio equipment corresponds to the configuration of the radio equipment as described above, and in addition, the first training data area is provided at a head of the slot, and the second training data area is provided at a tail of the slot.

The radio equipment corresponds to the configuration of the radio equipment as described above, and in addition, the reception propagation path estimating circuit provides a first reception coefficient vector and a second reception coefficient vector corresponding to an impulse response of the specific terminal of the propagation path from the specific terminal, based on the data of the first and second training data areas, respectively.

The radio equipment corresponds to the configuration of the radio equipment as described above, and in addition, the reception propagation path estimating circuit provides the first reception coefficient vector and the second reception coefficient vector, by ensemble average of each of the signals received by the plurality of antennas and a signal from the specific terminal separated by the reception signal separating circuit.

The present invention provides a radio equipment changing antenna directivity on real time basis and transmitting/receiving signals to/from a plurality of terminals by time division of the signal into a plurality of slots, including: a plurality of antennas arranged in a discrete manner; and a transmission circuit and a reception circuit sharing the plurality of antennas for transmitting/receiving signals; wherein the reception circuit includes a reception signal separating circuit for separating a signal from a specific terminal among the plurality of terminals, based on signals from the plurality of antennas, when a reception signal is received, and a reception propagation path estimating circuit estimating a propagation path from the specific terminal based on signals from the plurality of antennas, when the reception signal is received; the transmission circuit includes a transmission propagation path estimating circuit predicting a propagation path when a transmission signal is transmitted, based on a result of estimation by the reception propagation path estimating circuit, and a transmission directivity control circuit updating the antenna directivity when the transmission signal is transmitted, based on the result of estimation by the transmission propagation path estimating circuit; wherein each slot includes a training data area provided within the slot and having a prescribed number of training data, and a data area provided successive to the training data area and having a plurality of data each representing information to be transmitted/received; the reception propagation path estimating circuit provides a first estimation value and a second estimation value of the propagation path from the specific terminal, based on data of the training data area and the data area, respectively; and the transmission propagation path estimating circuit predicts propagation path when the transmission signal is transmitted, by extrapolation of the first and second estimation values.

The radio equipment corresponds to the configuration of the radio equipment as described above, and in addition, the training data area is provided at a head of the slot.

The radio equipment corresponds to the configuration of the radio equipment as described two paragraphs above, and in addition, the reception propagation path estimating circuit successively provides a first reception coefficient vector and a second reception coefficient vector corresponding to impulse response of the specific terminal of the propagation path from the specific terminal, based on a plurality of data in the training data area and the data area.

The radio equipment corresponds to the configuration of the radio equipment as described above, and in addition, the first reception coefficient vector and the reception coefficient vector are successively derived by steepest descent method.

The radio equipment corresponds to the configuration of the radio equipment as described two paragraphs above, and in addition the first reception coefficient vector and the second reception coefficient vector are successively derived by recursive least square method.

The present invention provides a radio equipment changing antenna directivity on real time basis and transmitting/receiving signals to/from a plurality of terminals by time division of the signal into a plurality of slots, including a plurality of antennas arranged in a discrete manner; and a transmission circuit and a reception circuit sharing the plurality of antennas for transmitting/receiving signals; wherein the reception circuit includes a reception signal separating circuit for separating a signal from a specific terminal among the plurality of terminals, based on signals from the plurality of antennas, when a reception signal is received, and a reception propagation path estimating circuit estimating a propagation path from the specific terminal based on signals from the plurality of antennas, when the reception signal is received; the transmission circuit includes a transmission propagation path estimating circuit predicting a propagation path when a transmission signal is transmitted, based on a result of estimation by the reception propagation path estimating circuit, and a transmission directivity control circuit updating the antenna directivity when the transmission signal is transmitted, based on the result of estimation by the transmission propagation path estimating circuit; wherein each slot includes a training data area provided within the slot and having a prescribed number of training data, and a data area provided successive to the training data area and having a plurality of data each representing information to be transmitted/received; the reception propagation path estimating circuit provides a plurality of estimation values of the propagation path from the specific terminal, based on the data of the training data area and the data area, respectively; and the transmission propagation path estimating circuit regresses the plurality of estimation values and predicts propagation path when the transmission signal is transmitted, by extrapolation based on a result of regression.

The radio equipment corresponds to the configuration of the radio equipment as described above, wherein the training data area is provided at a head of the slot.

The radio equipment corresponds to the configuration of the radio equipment as described two paragraphs above, and in addition, the reception transmission path estimating circuit successively provides a plurality of reception coefficient vectors corresponding to impulse response from the specific terminal of the propagation path from the specific terminal, based on a plurality of data in the training data area and the data area.

The radio equipment corresponds to the configuration of the radio equipment as described above and in addition, the plurality of reception coefficient vectors are successively provided by steepest descent method.

The radio equipment corresponds to the configuration of the radio equipment as described two paragraphs above, and in addition, the plurality of reception coefficient vectors are successively provided by recursive least square method.

The radio equipment corresponds to the configuration of the radio equipment as described in the first paragraph of this section, and in addition, the reception signal separating circuit includes a reception weight vector calculating unit receiving reception signals from the plurality of antennas and providing, on real time basis, a reception weight vector for separating a signal from the specific terminal, a plurality of first multipliers each receiving at one input reception signals from the plurality of antennas respectively, and receiving corresponding element of the reception weight vector respectively at the other input, and an adder adding signals from the plurality of multipliers; and the transmission directivity control circuit includes a transmission weight vector calculating unit providing a transmission weight vector based on a result of estimation from the transmission propagation path estimating circuit, and a plurality of second multipliers each receiving at one input a transmission signal, and receiving the transmission weight vector at the other input and applying to the plurality of antennas respectively.

The present invention provides a radio equipment changing antenna directivity on real time basis and transmitting/receiving signals time divisionally to/from a plurality of terminals, including: a plurality of antennas arranged in a discrete manner; and a transmission circuit and a reception circuit sharing the plurality of antennas for transmitting/receiving signals; wherein the reception circuit includes a reception signal separating circuit for separating a signal from a specific terminal among the plurality of terminals, based on signals from the plurality of antennas, when a reception signal is received, and a reception propagation path estimating circuit estimating a propagation path from the specific terminal based on signals from the plurality of antennas, when the reception signal is received; the transmission circuit includes a transmission propagation path estimating circuit predicting a propagation path when a transmission signal is transmitted, based on a result of estimation by the reception propagation path estimating circuit, and a transmission directivity control circuit updating the antenna directivity when the transmission signal is transmitted, based on the result of estimation by the transmission propagation path estimating circuit; wherein the reception signal separating circuit includes a reception weight vector calculating unit receiving reception signals from the plurality of antennas and providing, on real time basis, a reception weight vector for separating a signal from the specific terminal, a plurality of first multipliers each receiving at one input the reception signals from the plurality of antennas respectively and receiving corresponding element of the reception weight vector at the other input, and an adder adding signals from the plurality of multipliers; the transmission directivity control circuit includes a moving speed determining unit determining speed of movement of the specific terminal based on a result of estimation by the reception propagation path estimating circuit, a transmission weight vector calculating unit providing a transmission weight vector based on a result of estimation by the transmission propagation path estimating circuit, a switching circuit receiving the transmission weight vector and the reception weight vector, and selectively outputting in accordance with a result of determination by the moving speed determining unit, and a plurality of second multipliers receiving at one input a transmission signal and receiving an output of the switching circuit at the other input respectively, and applying to the plurality of antennas, respectively.

The present invention provides a radio equipment changing antenna directivity on real time basis and transmitting/receiving signals time divisionally to/from a plurality of terminals, including: a plurality of antennas arranged in a discrete manner; and a transmission circuit and a reception circuit sharing the plurality of antennas for transmitting/receiving signals; wherein the reception circuit includes a reception signal separating circuit for separating a signal from a specific terminal among the plurality of terminals, based on signals from the plurality of antennas, when a reception signal is received, and a reception propagation path estimating circuit estimating a propagation path from the specific terminal based on signals from the plurality of antennas, when the reception signal is received; the transmission circuit includes a transmission propagation path estimating circuit predicting a propagation path when a transmission signal is transmitted, based on a result of estimation by the reception propagation path estimating circuit, and a transmission directivity control circuit updating the antenna directivity when the transmission signal is transmitted, based on the result of estimation by the transmission propagation path estimating circuit; wherein the reception signal separating circuit includes a reception weight vector calculating unit receiving reception signals from the plurality of antennas and providing, on real time basis, a reception weight vector for separating a signal from the specific terminal, a reception signal level operating unit receiving the reception signals from the plurality of antennas and providing a reception level of the signal from the specific terminal, a plurality of first multipliers receiving at an input the reception signals from the plurality of antennas respectively, and receiving corresponding elements of the reception weight vector at the other input respectively, and an adder adding the signals from the plurality of multiplying units; and the transmission directivity control circuit includes a reception signal level determining unit determining a reception signal level of the specific terminal based on a result of operation of the reception signal level operating unit, a transmission weight vector calculating unit providing a transmission weight vector based on a result of estimation by the transmission propagation path estimating circuit, a switching circuit receiving the transmission weight vector and the reception weight vector and selectively outputting in accordance with a result of determination by the reception signal level determining unit, and a plurality of multipliers receiving at one input the transmission signal and receiving an output of the switching circuit at the other input respectively, and providing to the plurality of antennas, respectively.

BEST MODE FOR CARRYING OUT THE INVENTION

[First Embodiment]

Figure 1:
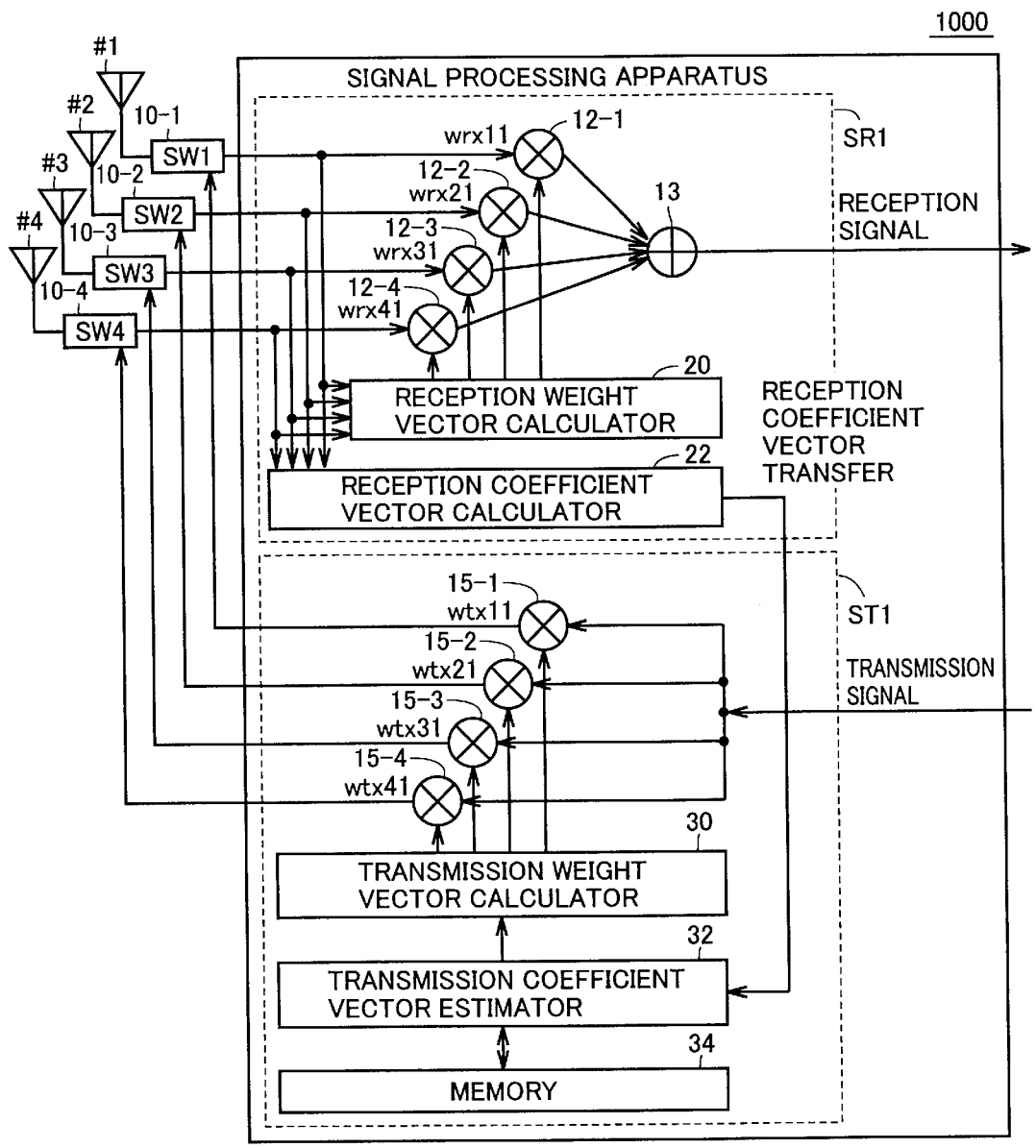
FIG. 1 is a schematic block diagram showing a configuration of a radio equipment (radio base station) 1000 of a PDMA base station to which the present invention is applied.

FIG. 1 is a schematic block diagram representing a radio equipment (radio base station) 1000 of a PDMA base station in accordance with an embodiment of the present invention.

In the configuration shown in FIG. 1, in order to distinguish a user PS1 from a user PS2, four antennas #1 to #4 are provided. The number of antennas, however, may be generally represented as N (N: natural number).

In the transmission/reception system 1000 shown in FIG. 1, a reception unit SR1 receiving signals from antennas #1 to #4 and separating a signal from a corresponding user (for example, user PS1), and a transmitting unit ST1 for transmitting a signal to user PS1 are provided. Connection between antennas #1 to #4 and reception unit SR1 or transmission unit ST1 is selectively switched by switches 10-1 to 10-4.

More specifically, reception signals RX1(t), RX2(t), RX3(t) and RX4(t) received by respective antennas are input to reception unit SR1 through corresponding switches 10-1, 10-2, 10-3 and 10-4, applied to a reception weight vector calculator 20 and a reception coefficient vector calculator 22, as well as to one input of each of multipliers 12-1, 12-2, 12-3 and 12-4, respectively.

To the other input of each of these multipliers, weight coefficients wrx11, wrx21, wrx31 and wrx41 for the reception signals of respective antennas are applied from reception weight vector calculator 20. The weight coefficients are calculated on real time basis by reception weight vector calculator 20, as in the prior art.

Transmission unit ST1 includes: a transmission coefficient vector estimator 32 receiving a reception coefficient vector calculated by reception coefficient vector calculator 22 and finding a transmission coefficient vector by estimating a propagation path at the time of transmission, that is, estimating a virtual reception coefficient vector at the time of transmission; a memory 34 communicating data with the transmission coefficient vector estimator 32 and storing and holding data; a transmission weight vector calculator 30 calculating a transmission weight vector based on the result of estimation by transmission coefficient vector estimator 32; and multipliers 15-1, 15-2, 15-3 and 15-4 receiving at one input a transmission signal and at the other input, weight coefficients wtx11, wtx21, wtx31 and wtx41 from transmission weight vector calculator 30, respectively. Outputs from multipliers 15-1, 15-2, 15-3, and 15-4 are applied through switches 10-1 to 10-4 to antennas #1 to #4.

Though not shown in FIG. 1, a configuration similar to that of reception unit SR1 and transmission unit ST1 is provided for each user.

[Principal of Operation of Adaptive Array]

The operation of reception unit SR1 will be briefly described in the following.

The reception signals RX1(t), RX2(t), RX3(t) and RX4(t) received by the antennas are represented by the following equations.

$$RX_1(t)=h_{11}Srx_1(t)+h_{12}Srx_2(t)+n_1(t) \quad (1)$$

$$RX_2(t)=h_{21}Srx_1(t)+h_{22}Srx_2(t)+n_2(t) \quad (2)$$

$$RX_3(t)=h_{31}Srx_1(t)+h_{32}Srx_2(t)+n_3(t) \quad (3)$$

$$RX_4(t)=h_{41}Srx_1(t)+h_{42}Srx_2(t)+n_4(t) \quad (4)$$

Here, the signal RXj(t) represents a reception signal of the j-th (j=1, 2, 3, 4) antenna, while the signal Srxi(t) represents a signal transmitted from the i-th (i=1, 2) user.

Further, the coefficient hji represents a complex coefficient of the signal from the i-th user and received by the j-th antenna, while nj(t) represents noise included in the j-th reception signal.

The equations (1) to (4) above in vector representation are as follows.

$$X(t)=H_1Srx_1(t)+H_2Srx_2(t)+N(t) \quad (5)$$

$$X(t)=[RX_1(t), RX_2(t), \ldots, RX_4(t)] \quad (6)$$

$$H_i=[h_{1i}, h_{2i}, \ldots, h_{4i}]^T, (i=1, 2) \quad (7)$$

$$N(t)=[n_1(t), n_2(t), \ldots, n_4(t)]^T \quad (8)$$

In equations (6) to (8), [ . . . ] T represents transposition of [ . . . ].

Here, X(t) represents an input signal vector, Hi represents a reception coefficient vector of the i-th user, and N(t) represents a noise vector, respectively.

The adaptive array antenna outputs a signal synthesized by multiplying the input signals from respective antennas by weight coefficients wrx11 to wrx41, as a reception signal SRX(t) as shown in FIG. 1.

Now, on the premise of the above described preparation, the operation of an adaptive array extracting the signal Srx1(t) transmitted from the first user is as follows.

The output signal y1(t) of adaptive array 100 can be represented by the following equations, by a multiplication of input signal vector X(t) and the weight vector W1.

$$y_1(t) = X(t) W_1^T \quad (9)$$

$$W_1 = [wrx_{11}, wrx_{21}, wrx_{31}, wrx_{41}]^T \quad (10)$$

More specifically, the weight vector W1 is a vector that has, as components, weight coefficients wrxj1 (j=1, 2, 3, 4) to be multiplied by the j-th input signal RXj(t).

Now, when we substitute input signal vector X(t) represented by the equation (5) for y1(t) represented by the equation (9), the following equation results.

$$y1(t) = H_1 W_1^T Srx_1(t) + H_2 W_1^T Srx_2(t) + N(t) W_1^T \quad (11)$$

When adaptive array 100 operates ideally here, weight vector W1 is sequentially controlled by weight vector control unit 11 to satisfy the following simultaneous equation, by a known method.

$$H_1 W_1^T = 1 \quad (12)$$

$$H_2 W_1^T = 0 \quad (13)$$

When weight vector W1 is fully controlled to satisfy equations (12) and (13), the output signal y1(t) from adaptive array 100 is eventually given by the following equations.

$$y1(t) = Srx_1(t) + N_1(t) \quad (14)$$

$$N_1(t) n_1(t) w_{11} + n_2(t) w_{21} + n_3(t) w_{31} + n_4(t) w_{41} \quad (15)$$

Namely, as the output signal y1(t), the signal Srx1(t) transmitted by the first of the two users is obtained.

[Summary of Operation of Radio Equipment 1000]

Figure 2:
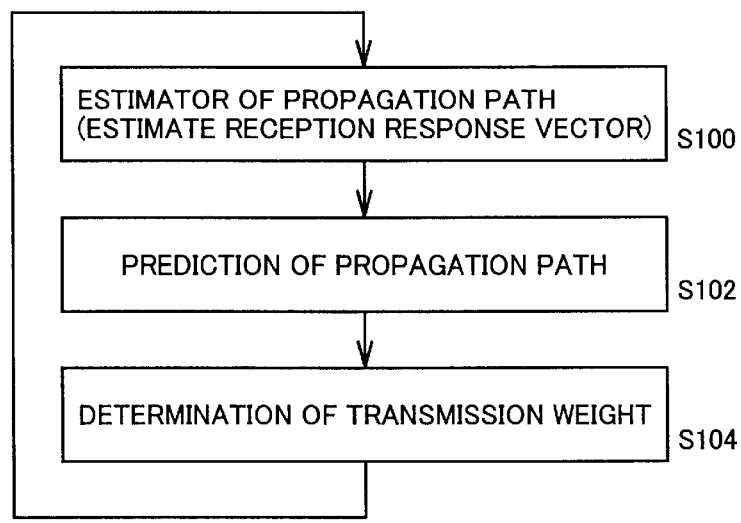
FIG. 2 is a flow chart illustrating an outline of the operation of the radio equipment (radio base station) 1000.

FIG. 2 is a flow chart representing an outline of a basic operation of radio equipment 1000 as the base of the present invention.

In radio equipment 1000, noting that the weight vector (weight coefficient vector) of the adaptive array can be represented uniquely by the reception coefficient vector of each antenna element, the weight is indirectly estimated, by estimating time variation of the reception coefficient vector.

First, at reception unit SR1, propagation path of the reception signal is estimated, based on the reception signal (step S100). Estimation of the propagation path corresponds to finding an impulse response of the signal transmitted from the user, in accordance with equations (1) to (4).

In other words, if the reception coefficient vector H1 can be estimated in equations (1) to (4), for example, the transmission path at the time of signal reception from user PS1 can be estimated.

Thereafter, transmission coefficient vector estimator 32 predicts propagation path at the time of transmission, that is, predicts reception coefficient vector at the time of transmission, from the reception coefficient vector at the time of reception (step S102). The predicted reception coefficient vector corresponds to the transmission coefficient vector at the time of transmission.

Further, transmission weight vector calculator 30 calculates the transmission weight vector based on the predicted transmission coefficient vector, and outputs the result to multipliers 15-1 to 15-4 (step S104).

[Operation of Reception Coefficient Vector Calculator 22]

An operation of reception coefficient vector calculator 22 in accordance with the first embodiment shown in FIG. 1 will be described.

First, assume that there are four antenna elements and two users communicate simultaneously. The signals output from reception circuit through respective antennas are represented by the equations (1) to (4) above.

At this time, the reception signals of the antennas represented by the equations (1) to (4) in vector representations are, again, given as equations (5) to (8).

$$X(t) = H_1 Srx_1(t) + H_2 Srx_2(t) + N(t) \quad (5)$$

$$X(t) = [RX_1(t), RX_2(t), \ldots, RX_n(t)]^T \quad (6)$$

$$H_i = [h_{1i}, h_{2i}, \ldots, h_{ni}]^T, (i=1, 2) \quad (7)$$

$$N(t) = [n_1(t), n_2(t), \ldots, n_n(t)]^T \quad (8)$$

When the adaptive array is operating satisfactorily, signals from respective users are separated and extracted, and therefore, the signals Srxi(t) (i=1, 2) all have the known values.

At this time, utilizing the fact that the signal Srxi(t) is a known signal, it is possible to extract reception coefficient vectors H1=[h11, h21, h31, h41] and H2=[h12, h22, h32, h42] in the following manner.

More specifically, by multiplying the reception signal by the known user signal, for example, the signal Srx1(t) from the first user, an ensemble average (time average) can be calculated in the following manner.

$$E[X(t) \cdot Srx_1^*(t)] = H_1 \cdot E[Srx_1(t) \cdot Srx_1^*(t)] + H2 \cdot E[Srx_2(t) \cdot Srx_1^*(t)] + E[N(t) \cdot Srx_1^*(t)] \quad (16)$$

In equation (16), E[. . . ] represents the time average, and S*(t) represents a conjugate complex of S(t). When the time for averaging is sufficiently long, the average value can be given by the following.

$$E[Srx1(t) \cdot Srx^*(t)] = 1 \quad (17)$$

$$E[Srx2(t) \cdot Srx1^*(t)] = 0 \quad (18)$$

$$E[N(t) \cdot Srx1^*(t)] = 0 \quad (19)$$

Here, the value of equation (18) becomes 0, as there is no correlation between the signal Srx1(t) and the signal Srx2(t). The value of the equation (19) becomes 0, as there is no correlation between the signal Srx1(t) and the noise signal N(t).

Therefore, the ensemble average of equation (16) is, as a result, equal to the reception coefficient vector H1, as shown below.

$$E[X(t) \cdot Srx_1^*(t)] = H_1 \quad (20)$$

By the above described procedure, the reception coefficient vector H1 of the signal transmitted from the first user PS1 can be estimated.

In the similar manner, by an ensemble averaging operation of input signal vector X(t) and the signal Srx2(t), it is possible to estimate the reception coefficient vector H2 of the signal transmitted from the second user PS2.

The above described ensemble averaging is performed for a train of a prescribed number of data symbol at the head and a train of a prescribed number of data symbol at the end within one time slot at the time of reception.

[Estimation of Transmission Coefficient Vector]

Figure 3:
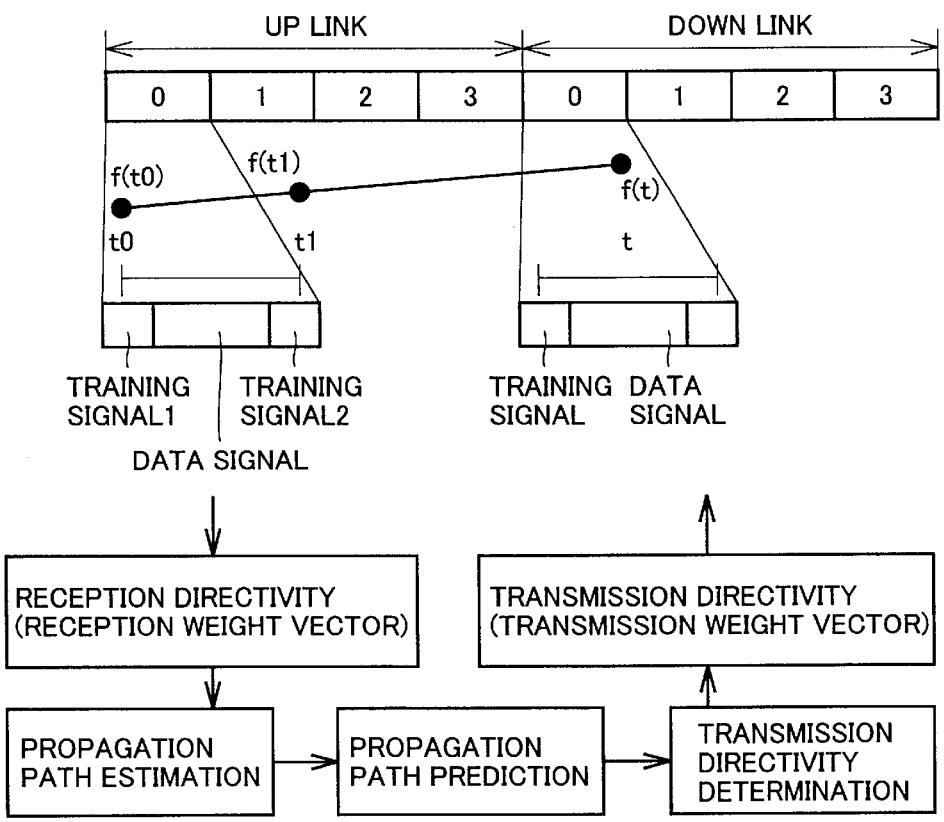
FIG. 3 is a schematic diagram representing a basic operation of a transmission coefficient vector estimator 32.

FIG. 3 is a schematic diagram representing an operation of the transmission coefficient vector estimator 32. Consider a 8-slot configuration in which 4 users are allocated for up and down links as PDMA burst. As to the slot configuration, the head 31 symbols constitute the first training symbol train, succeeding 68 symbols constitute data symbol train and the last 31 symbols constitute the second training symbol train, for example.

As described above, training symbol trains are provided at the head and at the end of the up link slot, and both reception coefficient vectors are calculated using the algorithm of the reception coefficient vector calculator 22 described above.

By linear extrapolation, the reception coefficient vector for the down link is estimated.

More specifically, assuming that a value at an arbitrary time point t of an element of the reception coefficient vector is f(t), based on the value f(t0) at a time point to of the head training symbol train of the up link slot and on the value f(t1) at a time point t1 of the last training symbol train of the up link slot, the value f(t) at a time point t of the down link slot can be predicted in the following manner.

$$f(t)=[f(t1)-f(t0)]/(t1-t0)\times(t-t0)+f(t0)$$

More specifically, the training symbol trains are provided at the head and at the end of the up link slot and first order extrapolation is performed in the above described example. A training symbol train may be additionally provided at a central portion of the up link slot, and the value f(t) at the time point t may be estimated by second order extrapolation, from values of three points within the up link slot of the reception coefficient vector. Alternatively, higher order of extrapolation becomes possible by increasing the number of positions at which training symbol trains are provided within the up link slot.

[Determination of Transmission Weight Vector]

When the estimation value of the reception coefficient vector at the time of transmission is calculated in the above described manner, the transmission weight vector can be found by any of the following three methods.

i) Method Utilizing Orthogonalization

Consider a weight vector $W^{(1)}$ (i)=[wtx11, wtx12, wtx13, wtx14] at a time point t=iT (i: natural number, T: unit time interval) of a user PS1. In order to place nulls to user PS2, the following conditions should be satisfied.

Assume that a predicted propagation path (reception coefficient vector) for the user PS2 is $V^{(2)}(i)$=[h1'$^{(2)}$(i), h2'$^{(2)}$(i), h3'$^{(2)}$ (i), h4'$^{(2)}$ (i)]. Here, hp' (q) (i) represents a predicted value at a time point i of the reception coefficient vector for the p-th antenna of the q-th user. It is assumed that the propagation path $V^{(1)}$ (i) for the user PS1 has already been predicted in the similar manner.

Here, $W^{(1)}$ (i) is determined to satisfy that $W^{(1)}$ (i)$^T V^{(2)}$ (i)=0. The following conditions c1) and c2) are imposed as binding conditions.

$$W^{(1)}(i)^T V^{(1)}(i)=g \text{ (constant value)} \quad \text{c1)}$$

$$\|W^{(1)}(i)\| \text{ is a minimum value} \quad \text{c2)}$$

The condition c2) corresponds to minimization of the transmission power.

ii) Method Utilizing Spurious Correlation Matrix

Here, the adaptive array includes a number of antenna elements and a portion controlling the weight values of respective elements, as already described. Generally, when we represent the input vector of an antenna as X(t) and weight vector as W, optimal weight Wopt can be given by the following equation (Wiener solution) when the weight vector is controlled to minimize means square deviation between the output Y(t)=WTX(t) and the reference signal d(t) (MMSE standard: least square method standard).

$$W_{opt} = R_{xx}^{-1} r_{xd} \quad (21)$$

Here, the following relations must be satisfied.

$$R_{xx}=E[X^*(t)xT(t)] \quad (22)$$

$$r_{xd}=E[x^*(t)d(t)] \quad (23)$$

Here, YT represents transposition of Y, Y* represents complex area of Y, and E[Y] represents an ensemble average. By this weight value, the adaptive array comes to generate an array pattern to suppress unnecessary interfering wave.

In the method utilizing the spurious correlation matrix, the equation (21) above is calculated in accordance with the spurious correlation matrix which will be described below.

More specifically, the weight vector $W^{(k)}$ (i) for the user k is calculated, using the estimated complex reception signal coefficient h'$^{(k)}_n$ (i). Assuming that the array response vector of the k-th user is $V^{(k)}$ (i), it can be given by the following equation, as already described.

$$V^{(k)}(i) = [h'^{(k)}_1(i), h'^{(k)}_2(i) \ldots, h'^{(k)}_N(i)] \quad (24)$$

At this time, the autocorrelation matrix Rxx (i) of the virtual reception signal at t=iT can be given by the following equation, using $V^{(k)}$ (i).

$$R_{xx}(i) = \sum_{k=1}^{K} V^{(k)*}(i) V^{(k)T}(i) + NI \quad (25)$$

Here, N is a virtual noise term added, as Rxx (i) should be an integer. In the calculation for the present invention, N is N=1.0×10$^{-5}$, as an example.

The correlation vector rxd(i) between the reception signal and the reference signal is given by the following equation.

$$r_{xd}(i)=V^{(k)*}(i) \quad (26)$$

Thus, the down link weight at time t=iT can be calculated by the equations (21), (25) and (26).

The inverse matrix operation of the equation (25) can be optimally calculated for the user k in accordance with the lemma of inverse matrix. Especially when there are two users, the weight can be calculated in accordance with the following simple equations.

$$W^{(1)}(i)=(p_{22}+N)V^{(1)*}(i)-p_{12}V^{(2)*}(i) \quad (27)$$

$$W^{(2)}(i)=(p_{11}+N)V^{(2)*}(i)-P_{21}V^{(1)*}(i)$$

$$p_{ij}=V^{(i)H}(i)V^{(j)}(i) \quad (28)$$

The method of calculating a weight vector when autocorrelation matrix is given in this manner is described, for example, in T. Ohgane, Y. Ogawa, and K. Itoh, Proc. VTC '97, vol. 2, pp. 725–729, May 1997 or Tanaka, Ogahne, Ogawa, Itoh, Technical Report of the Institute of Electronics, Information and Communication Engineers, vol. RCS98-117, pp. 103–108, October 1998.

iii) Method Directing a Beam to User PS1

Focusing on the point that the beam is directed to the user PS1, what is necessary is to satisfy the following equation.

$$W^{(1)}(i)=V^{(1)}(i)*$$

By determining the weight vector at the time of transmission by any of the above described methods for transmission, it is possible to suppress degradation of transmission directivity of the down link generated by the time difference between the up an down links even in the TDD/PDMA method, assuming a dynamic Raleigh propagation path including angular spread.

[Modification of the First Embodiment]

In the first embodiment, propagation path estimation is performed by using ensemble average represented by the equation (20).

Figure 4:
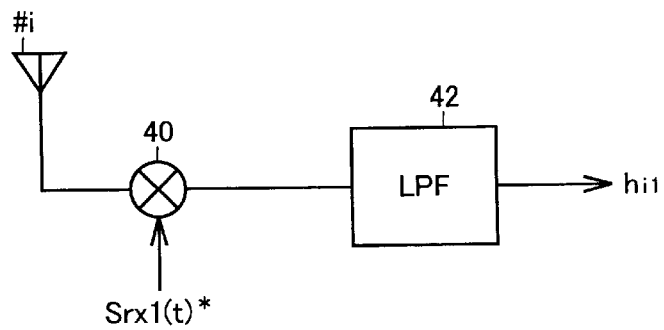
FIG. 4 shows another configuration of the reception coefficient vector calculator 22 in accordance with a modification of the first embodiment.

FIG. 4 represents another configuration of the response coefficient vector calculator 22 in accordance with a modification of the first embodiment.

As can be seen from FIG. 4, a signal from the ith antenna is multiplied by a signal Srx1(t)* of complex conjugate of the signal Srx1(t) from the first user PS1 output from the adaptive array antenna by means of a multiplier 40, and pass through a narrow band filter 42, $h_{i1}(t)$ is obtained as an output from narrow band filter 42.

When this is done for every antenna, the reception coefficient vector for the user PS1 can be found. Similarly, when a signal from the ith antenna is multiplied by the signal Srx2(t)* of complex conjugate of the signal Srx2(t) from the second user PS2 output from adaptive array antenna and passed through a narrow band filter (not shown), $h_{i2}$ (t) is obtained as the output from the narrow band filter.

When this is done for every antenna, the reception coefficient vector for the user PS2 can be found.

The procedure for predicting the propagation path and determining the transmission weight vector can be performed in the similar manner as in the first embodiment.

Therefore, by this configuration, it is possible to attain similar effects as in the first embodiment.

[Second Embodiment]

In the first embodiment, propagation path estimation is performed by using ensemble average represented by the equation (20).

In the second embodiment, the propagation path estimation is performed by using correlation vector of the adaptive array. More specifically, as represented by the equations (21) to (23) above, when the adaptive array operates in accordance with MMSE standard, the optimal weight vector $W_{opt}$ can be represented by the following equation, using reference signal d(t), auto correlation matrix $R_{xx}$ and correlation vector $r_{xd}$.

$$W_{opt}=R_{xx}^{-1}r_{xd} \quad (21)$$

$$R_{xx}=E[X^*(t)xT(t)] \quad (22)$$

$$r_{xd}=E[x^*(t)d(t)] \quad (23)$$

Here, each component of the correlation vector $r_{xd}$ can be written in the following manner, when the weight vector for the first user PS1 is being calculated.

$$r_{xd}=[E[RX_1(t)d(t)^*], \ldots, E[RX_4(t)d(t)^*]]^T \sim [h_{11}, h_{21}, h_{31}, h_{41}]$$

Namely, in the process in which the reception weight vector calculator 20 calculates the weight vector for the first user PS1, the reception coefficient vector of user PS1 can also be calculated, as the derived value of the correlation vector $r_{xd}$ is used.

Therefore, when a training symbol train is included at the head and the tail of the up link slot, for example, propagation path estimation of user PS1 becomes possible at time points t0 and t1 as in the example of FIG. 3, and the propagation path at the time point t for transmission can be predicted. The same applies to other users.

Subsequent procedure for predicting the propagation path and determining the transmission weight vector can be performed in the similar manner as in the first embodiment.

Therefore, by such a procedure also, similar effects as in the first embodiment can be attained.

[Third Embodiment]

In the second embodiment, propagation path estimation is performed by using the correlation vector.

As the third embodiment, another method of calculation by the reception coefficient vector calculator 22 will be described in the following.

A value obtained by subtracting a result of multiplication of the signal Srx1(t) from the first user PS1 output from the adaptive array antenna by a virtual reception coefficient vector $h'_{i1}$ (t) from the value f the signal Rxi(t) from the ith antenna is newly referred to as Rxi'(t).

$$RXi'(t)=RXi(t)-h'_{i1}(t)\cdot Srx1(t)$$

Reception coefficient vector calculator 22 in accordance with the third embodiment calculates the value $h'_{i1}(t)$ that minimizes $E[|Rxi'(t)|^2]$ by the following sequential method.

Assume that data from k=0 to k=M (for example 119) are contained in one up link slot.

When the true reception coefficient vector is represented by $h'_{i1}(t)$, the value $E[|Rxi'(t)|^2]$ is minimized, when the following condition is satisfied.

$$h'_{i1}(t)=h_{i1}(t)$$

When the steepest-descent method is used, the following recurrence formula for $h'_{i1}(k)$ (the value when the time t=kT, k: natural number) is obtained.

$$h'_{i1}(k+1)=h'_{i1}(k)+\mu\{RXi(k)-h'_{i1}(k)\cdot Srx1(k)\}\cdot Srx1^*(k)$$

Here, the constant , represents a step size. Though not limiting, the initial value of $h'_{i1}(k)$ may be $h'_{i1}(0)=0$.

Figure 5:
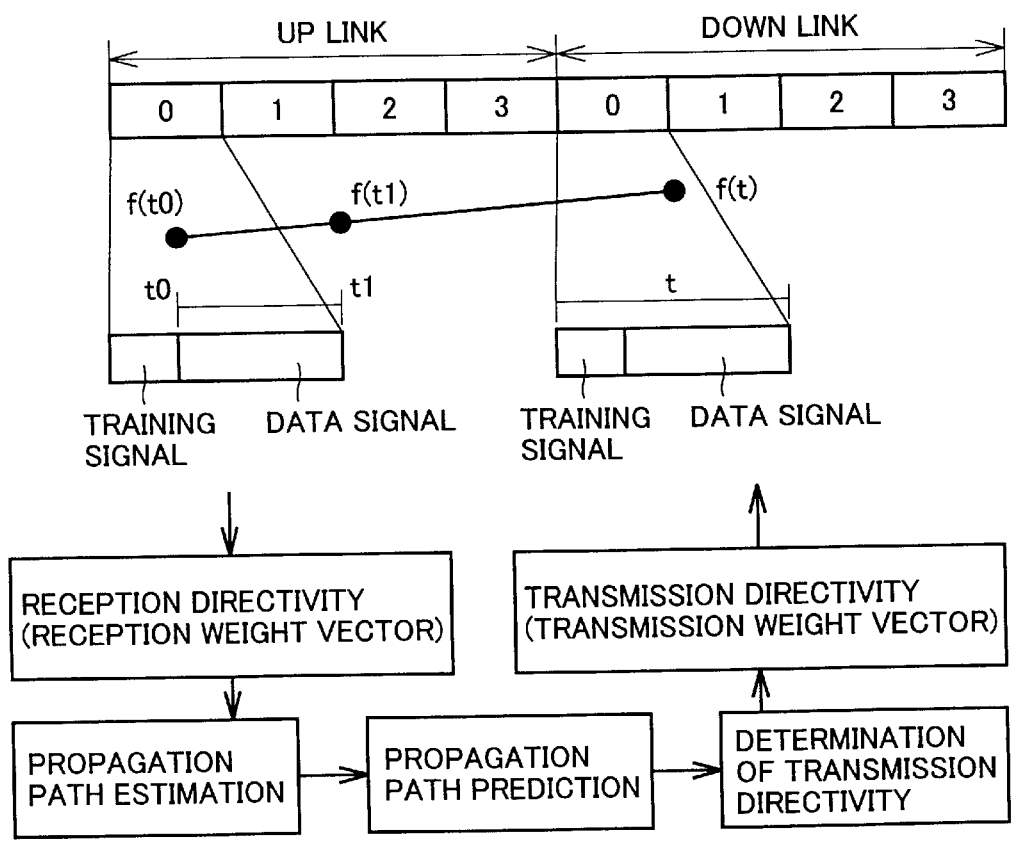
FIG. 5 is an illustration showing the concept of propagation path estimation, when estimation is to be performed successively.

FIG. 5 is an illustration showing the concept of propagation path estimation, when estimation is performed sequentially. FIG. 5 is to be compared with FIG. 3. In correspondence with calculation of $h'_{i1}(k)$ by the recurrence formula, the time t0 of the up link slot is set to be the preamble end time point, and the time point t1 is set to be the end time point of the up link slot. Therefore, the training symbol train have only to exit at the head of the up link slot.

By performing this operation for every antenna, it is possible to calculate the reception coefficient vector for the user PS1 and to predict the propagation path.

When the similar process is performed for the user PS2, it is possible to calculate the reception coefficient vector for the user PS2 and to predict the propagation path.

The subsequent procedure for determining the transmission weight vector can be performed in the similar manner as the first embodiment.

Therefore, by this configuration, similar effects as in the first embodiment can be attained.

Further, propagation path estimation can be performed in the similar manner in accordance with the method using another recurrence formula, which will be described in the following.

Though the time t0 is set to be the preamble end time point in FIG. 5, the time point t0 is not necessarily limited to this position. The time point t0 may exist in the training symbol train, or it may exist in the data symbol train. Further, though time point t1 is set to be the time point of the up link slot, the time point t1 is not necessarily limited to this position, either.

[Fourth Embodiment]

In the third embodiment, the reception coefficient vector for each user is calculated sequentially.

Another method of calculation by the reception coefficient vector calculator 22 will be described in the following as the fourth embodiment.

A value obtained by subtracting a result of multiplication of the signal Srx1(t) from the first user PS1 output from the adaptive array antenna and a virtual reception coefficient vector $h'_{i1}(t)$ and the result of multiplication of the signal Srx2(t) from the second user PS1 and a virtual reception coefficient vector $h'_{i2}(t)$ from the signal RXi(t) of the ith antenna is newly referred to as RXi'(t), Namely, $$RXi'(t)=RXi(t)-h'_{i1}(t)\cdot Srx1(t)-h'_{i2}(t)\cdot Srx2(t)$$

In reception coefficient vector calculator 22 in accordance with the fourth embodiment, $h'_{i1}(t)$ and $h'_{i2}(t)$ that minimize the value $E[|RXi'(t)|^2]$ are calculated together in the following manner.

More specifically, when $$H'_i(t)=[h'_{i1}(t), h'_{i2}(t)]^T$$

$$SRX(t)=[Srx1(t), Srx2(t)]^T,$$

from the condition that the gradient of $E[|RXi'(t)|^2]$ with respect to the vector $H'_i(t)$ is 0, the following equations can be obtained, where the true reception coefficient vector is represented as $H'_{iOPT}(t)$.

$$H_{iOPT}(t)=R_{ss}^{-1}r_{sx}$$

$$R_{ss}^{-1}=E[SRX^*(t)SRXT(t)]$$

$$r_{sx}=E[SRX^*(t)RXi(t)]$$

The concept of propagation path estimation in this manner is similar to the concept shown in FIG. 3, for example.

When this operation is performed for every antenna, it is possible to calculate the reception coefficient vectors for the users PS1 and PS2, and to predict the propagation path.

The subsequent procedure for determining the transmission weight vector can be performed in the similar manner as in the first embodiment.

Therefore, by this configuration, similar effects as in the first embodiment can be attained.

[Fifth Embodiment (Proposed Method 1)]

A still further method of calculation by the reception coefficient vector calculator 22 will be described in the following, as the fifth embodiment. The following method is equivalent to a so-called Recursive Least-Squares algorithm (RLS algorithm).

A value obtained by subtracting a result of multiplication of an output signal vector SRX(t) output from the adaptive array antenna and a virtual reception coefficient vector $H'_i{}^T(t)$ from the signal RXi(t) from the ith antenna is newly referred to as RXi'(t). Namely, $$RXi'(t)=RXi(t)-H'_i{}^T(t)SRX(t)$$

According to the RLS algorithm, the following equations hold.

$$H'_i(k+1)=H'_i(k)+R_{ss}^{-1}(k)SRX^*(k)RXi'(k) \quad (29)$$

$$RXi'(k)=RXi(k)-H'_i{}^T(k)SRX(k) \quad (30)$$

$$R_{ss}^{-1}(k)=1/\lambda\cdot R_{ss}^{-1}(k-1)-1/\lambda\cdot[R_{ss}^{-1}(k-1)SRX^*(k)SRX(k)^T R_{ss}^{-1}(k-1)]/[\lambda+SRX(k)^T R_{ss}^{-1}(k-1)SRX^*(k)]$$

It is again assumed that data from k=0 to k=M (for example, 119) are contained in one up link slot.

Here, the constant $\lambda$ ($0<\lambda\leq 1$) represents a forgetting factor. Initial values of various elements of $H'_i(t)$ may be set to 0, though not limiting.

Thus, propagation path estimation may be performed in the similar manner as represented by the concept shown in FIG. 5.

When this operation is performed on every antenna, it is possible to calculate the reception coefficient vector for the user PS1 and to predict the propagation path.

When similar processing is performed for the user PS2, it is possible to calculate the reception coefficient vector for the user PS2 and to predict propagation path.

The subsequent procedure to determine the transmission weight vector can be performed in the similar manner as in the first embodiment.

Therefore, by this configuration, it is possible to attain similar effects as in the first embodiment.

[Modification of the Fifth Embodiment (Proposed Method 2)]

In the fifth embodiment, prediction of the propagation path is performed from the data of two points, that is, time points t0 and t1, in accordance with the concept shown in FIG. 5.

In the modification of the fifth embodiment, a regression curve is calculated and used for first order extrapolation, from impulse responses of which number corresponds to the number of data symbols successively calculated in the up link slot period+1.

Figure 6:
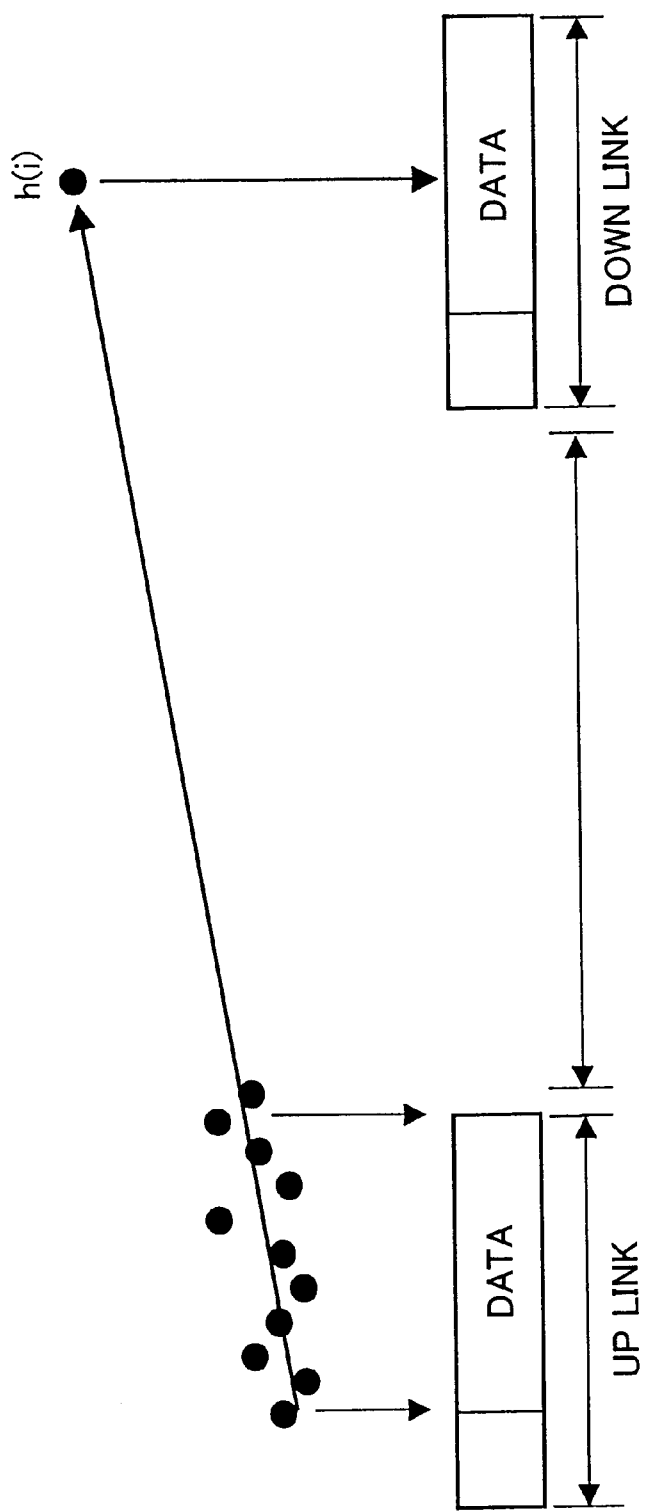
FIG. 6 is an illustration showing the concept of propagation path estimation in which a regression curve is calculated from impulse response successively found for the up link slot period.

FIG. 6 is an illustration showing the concept of estimating propagation path (impulse response), by calculating the regression curve from the successively calculated impulse responses of the up link slot period. As compared with extrapolation of two points only, the number of data is significantly increased, whereby estimation error can be suppressed.

As to the method of extrapolation using regression curve, it is not limited to the first order extrapolation described above, and extrapolation curves of higher order may be used, and alternatively, regression by periodic function such as sign-cosine function may be performed for extrapolation.

[Sixth Embodiment]

A still further method of calculation by reception coefficient vector calculator 22 will be described in the following as the sixth embodiment. The method described in the following is equivalent to a so-called steepest descent method (LMS algorithm).

As in the fifth embodiment, a value obtained by subtracting a result of multiplication of output signal vector SRX(t) output from the adaptive array antenna and a virtual reception coefficient vector $H'_i{}^T(t)$ from the signal RXi(t) of the ith antenna is newly referred to as RXi'(t).

$$RXi'(t)=RXi(t)-H'_i{}^T(t)SRX(t)$$

According to the LMS algorithm, the following equation holds.

$$H'_i(k+1)=H'_i(k)+\mu SRX^*(k)RXi'(k).$$

It is again assumed here that data from k=0 to k=M (for example, 119) are contained in one up link slot.

Here, the constant $\mu$ represents a step size, and it must satisfy the following relation, from the condition of convergence.

$$0<\mu<1/\lambda\max$$

Here, $\lambda$max is the maximum eigen value of the correlation matrix $R_{xx}$. The initial values of various elements of $H'_i(t)$ may be set to 0, though not limiting.

Thus, propagation path estimation may be performed in the similar manner as the concept shown in FIG. 5.

When this operation is performed for every antenna, it is possible to calculate the reception coefficient vector for the user PS1 and to predict the propagation path.

When the similar process is performed for the user PS2, it is possible to calculate the reception coefficient vector for the user PS2 and to predict the propagation path.

The subsequent procedure to determine the transmission weight vector may be performed in the similar manner as in the first embodiment.

Thus, by this configuration, it is possible to attain similar effects as in the first embodiment.

In the sixth embodiment, it is possible as in the modification of the fifth embodiment to calculate a regression curve from the impulse responses of which number corresponds to the number of data symbols successively calculated in the up link slot period +1, and to perform first order extrapolation.

The method of propagation path estimation is not limited to the methods according to the first to sixth embodiments described above. For example, direct method (SMI: Sample Matrix Inversion) or the like may be used. In accordance with the SMI method, propagation path can be predicted in accordance with the concept shown in FIG. 3.

[Seventh Embodiment]

A still further method of calculation by the reception coefficient vector calculator 22 will be described in the following as the seventh embodiment. The following method is equivalent to a so-called AR model (Autoregressive model).

In the following, one of the elements of the reception coefficient vector will be represented by f(t).

Figure 7:
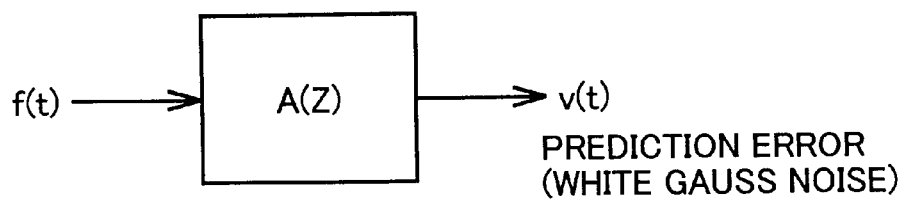
FIG. 7 is a first schematic illustration showing an AR model in accordance with the seventh embodiment.

FIG. 7 is a first schematic illustration representing the AR model in accordance with the seventh embodiment. As can be seen in FIG. 7, time change of the element f(t) is regarded as the AR model. Here, v(t) represents prediction error (white gauss noise).

Figure 8:
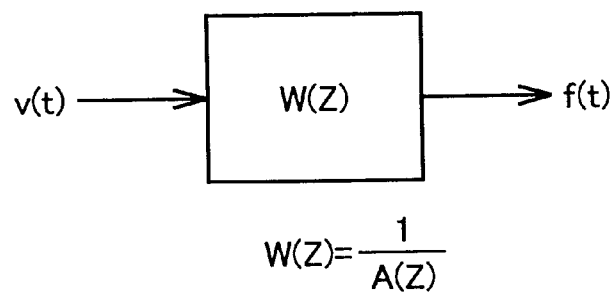
FIG. 8 is a second schematic illustration showing the AR model of the seventh embodiment.

FIG. 8 is a second schematic illustration representing the AR model in accordance with the seventh embodiment. Further, as shown in FIG. 8, it is possible to form an AR model by a filter having opposite characteristic to filter A(z).

When the aforementioned V(t) is input to the input of the AR model, the element f(t) can be recovered, and by inputting an unknown white noise, it is possible to predict the future of the element f(t).

Figure 9:
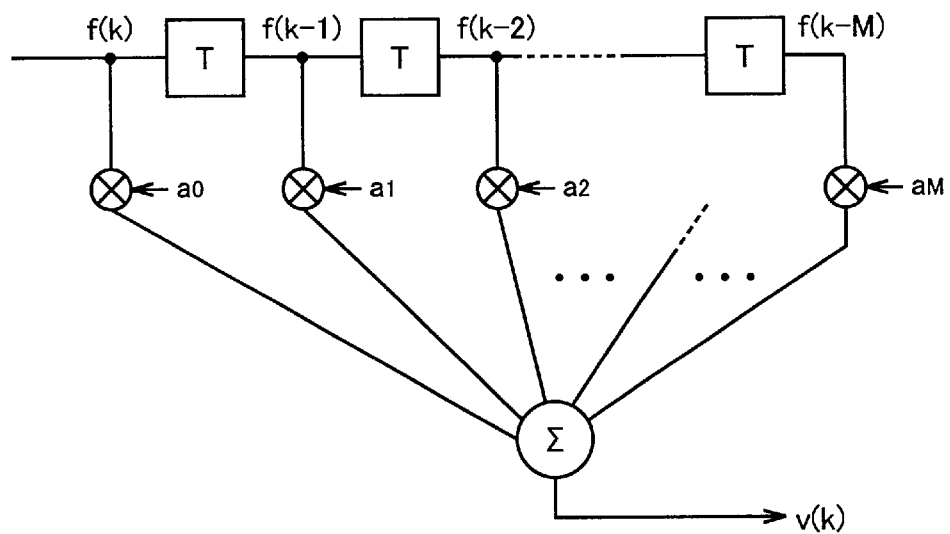
FIG. 9 is a schematic block diagram showing the configuration of a filter A(z) shown in FIG. 7.

FIG. 9 is a schematic block diagram showing a configuration of the filter A(z) shown in FIG. 7.

In FIG. 9, multiplication coefficients $a_0$ to $a_M$ are determined to minimize $E[|v(k)|^2]$.

Figure 10:
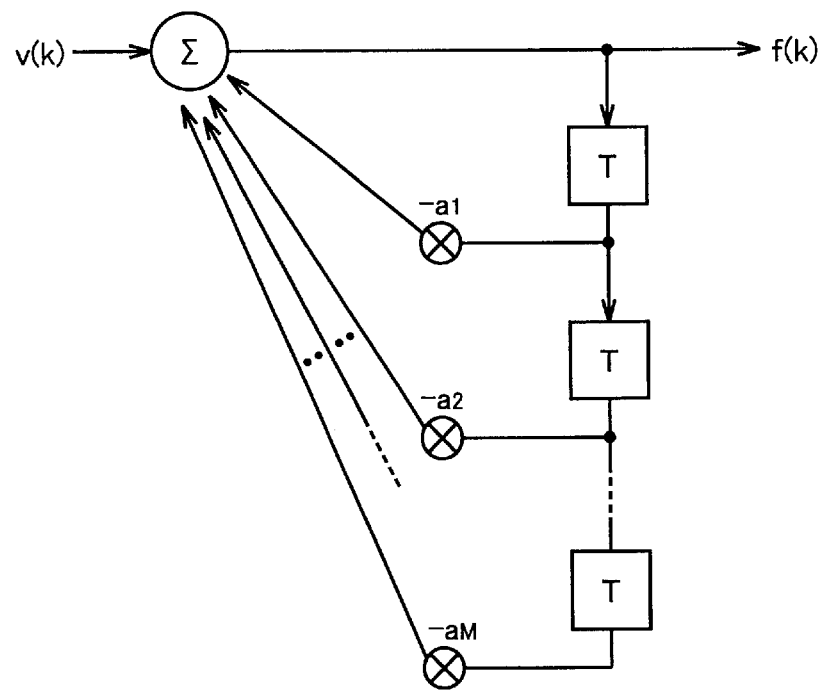
FIG. 10 is a schematic block diagram showing the configuration of an inverse filter W(z) of the filter A(z) in the AR model.

If $\{f(k)\}$ is an Mth AR model, then $\{v(k)\}$ represents a white Gaussian process. FIG. 10 is a schematic block diagram representing a configuration of the inversion filter W(z) of the filter A(z) of the AR model.

When k is within an observation period, the error filter output v(k) of FIG. 9 is provided as the input of FIG. 10. When k goes out of the observation period, white gauss noise is applied as the input.

By this calculation method also, similar effects can be attained as in the first embodiment, similar to other methods.

[Computer Simulation]

In the following, the result of computer simulation of the influence of propagation path prediction in accordance with the proposed methods 1 and 2 as well as the SMI method among the first to sixth embodiments described above on the error rate will be described.

Figure 11:
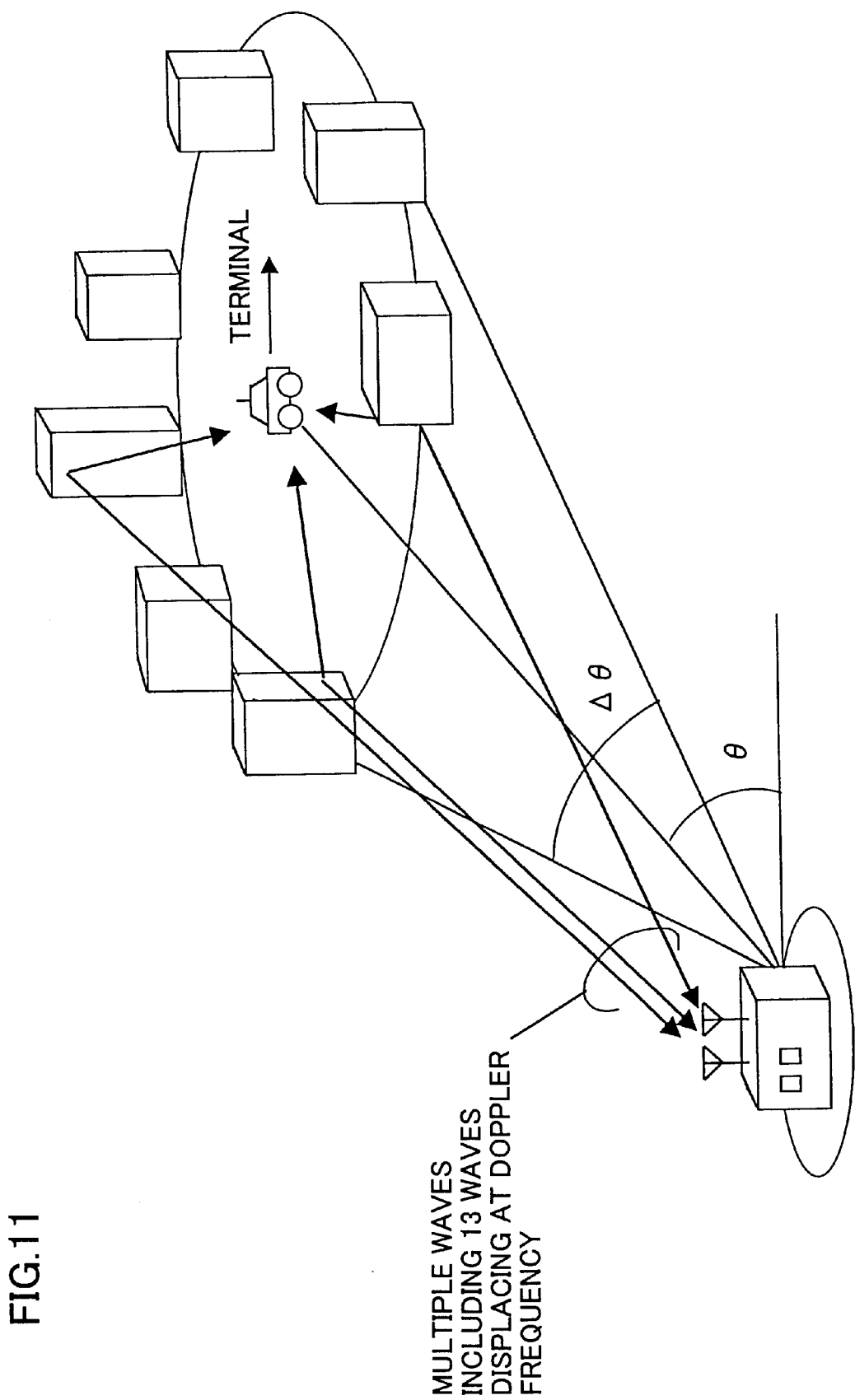
FIG. 11 is an illustration representing a transmission path model in which 13 reflection points are arranged at equal interval.

FIG. 11 is a schematic diagram representing a transmission path model to be discussed in the following. At a place of a prescribed distance or more from a base station, a terminal runs at a constant speed, and around the terminal, 13 reflection points are arranged at equal interval. Here, it is assumed that multiple waves including 13 waves that displace at the Doppler frequency are transmitted/received through respective reflection points, and that wave phases are provided with mutually different displacements.

It is assumed that the delay time difference of the baseband signal derived from the wave path length is negligible. The direction of a coming signal measured along the axial direction is represented by θ, and angular spread of the propagation path viewed from the base station is represented by Δθ.

The fading correlation between array elements generally lowers as angular spread Δθ increases.

When there is low fading correlation, amplitude-phase difference of complex signal between array elements vary as the fading value varies with time, so that optimal array pattern also varies as time passes. Here, transmission is performed using the weight obtained for the up link as it is for the down link, an error would be generated in the array pattern, because of time difference in transmission.

Figure 12:
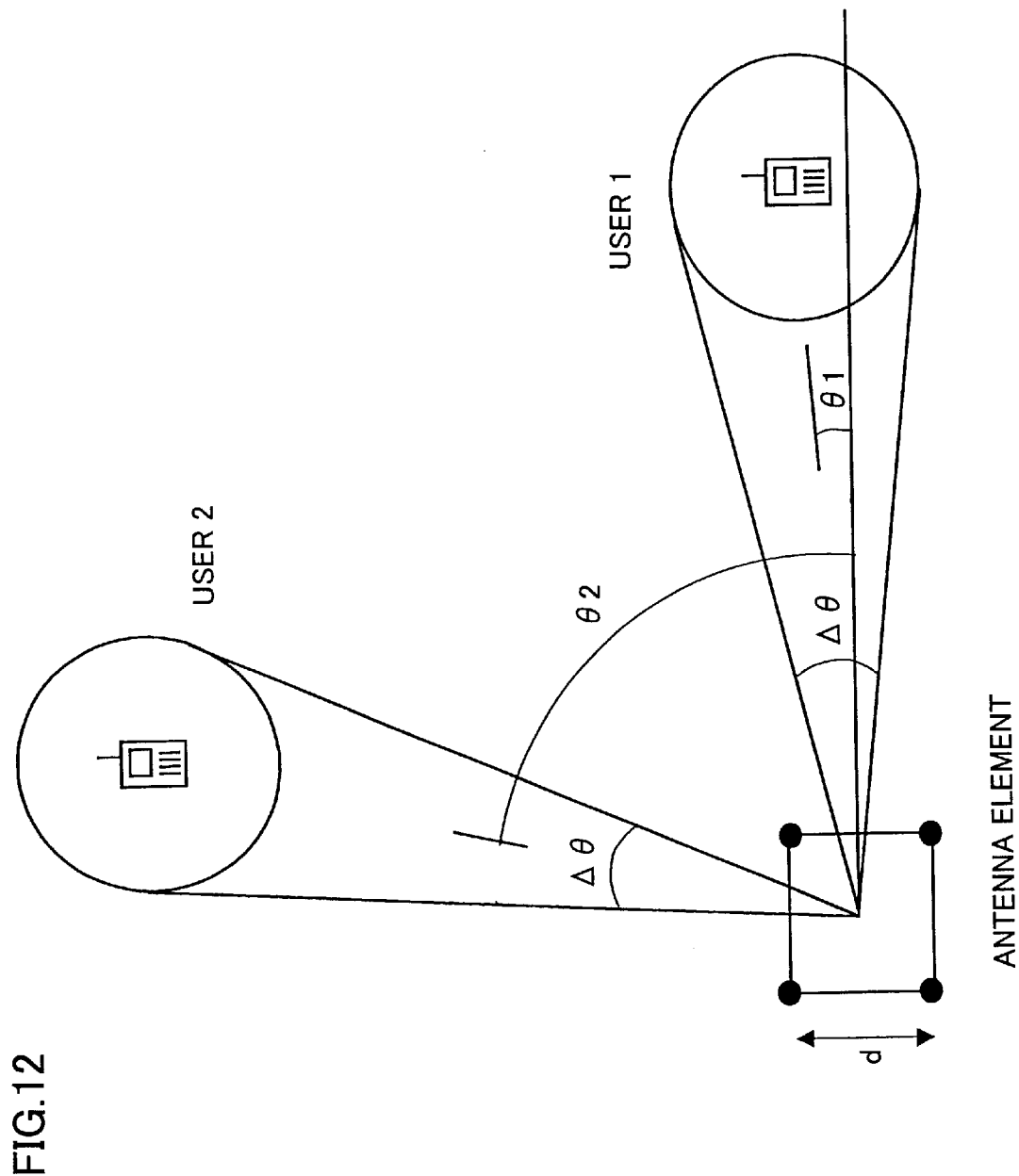
FIG. 12 is a schematic illustration of the TDD/PDMA system.

FIG. 12 is a schematic illustration representing the TDD/PDMA system, which will be discussed in the following. Referring to FIG. 12, consider the TDD/PDMA system in which an adaptive array of 4 elements with an interval between the elements being d is used as the base station, and two users in a cell are accommodated for one same channel.

Signal coming directions for respective users are represented as $\theta_1$ and $\theta_2$, and it is assumed that the angular spread Δθ and the average power are equal.

The set parameter values are as follows: d=5λ, $\theta_1$=0 deg, $\theta_2$=88.4 deg.

Figure 13:
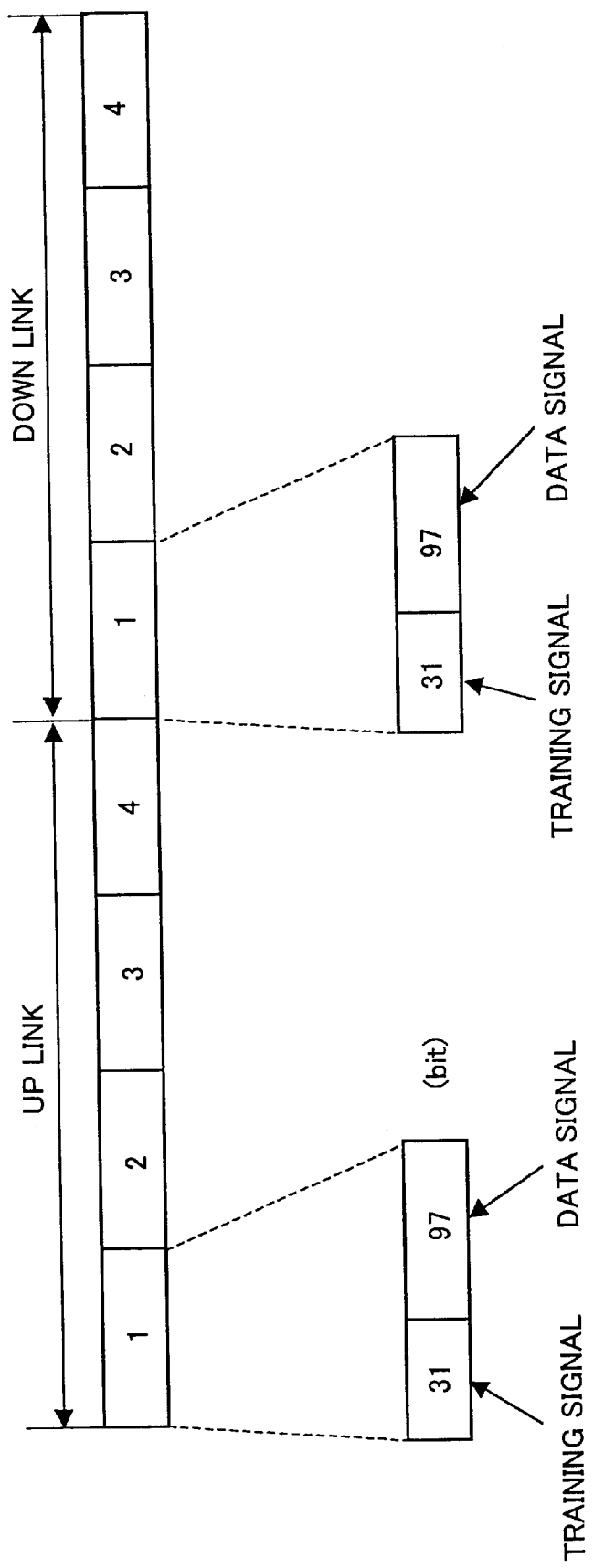
FIG. 13 shows a slot configuration of PDMA.

FIG. 13 represents a PDMA slot configuration. Consider a 8-slot configuration in which two users are allocated for up and down links as PDMA burst, as shown in FIG. 13. As to the configuration, the head 31 symbols constitute the training symbol train, and succeeding 97 symbols constitute a data symbol train. The up link slot configuration when estimation is performed in accordance with SMI extrapolation will be described later.

It is assumed that carrier reproduction at the terminal is perfect for the down link. The modulation method is QPSK, and the transmission rate is 400 kb/s. Average BER (Bit Error rate) is calculated for burst transmission of 100,000 times.

i) Characteristic With Respect to Average $E_b/N_0$.

i-1) Ideal Estimation

First, let us consider an example in which ideal weight estimation (conventional method) and channel estimation (propagation path estimation: proposed method) are performed for the lower limit of BER characteristic.

More specifically, the weight for the down link is estimated by calculating the weight and the result of channel estimation of the tail of the training symbol train and the tail of the data symbol train by Wiener solution and performing linear extrapolation. As a reference, an example is also shown in which the weight of the tail of the up link slot is fixed.

Figure 14:
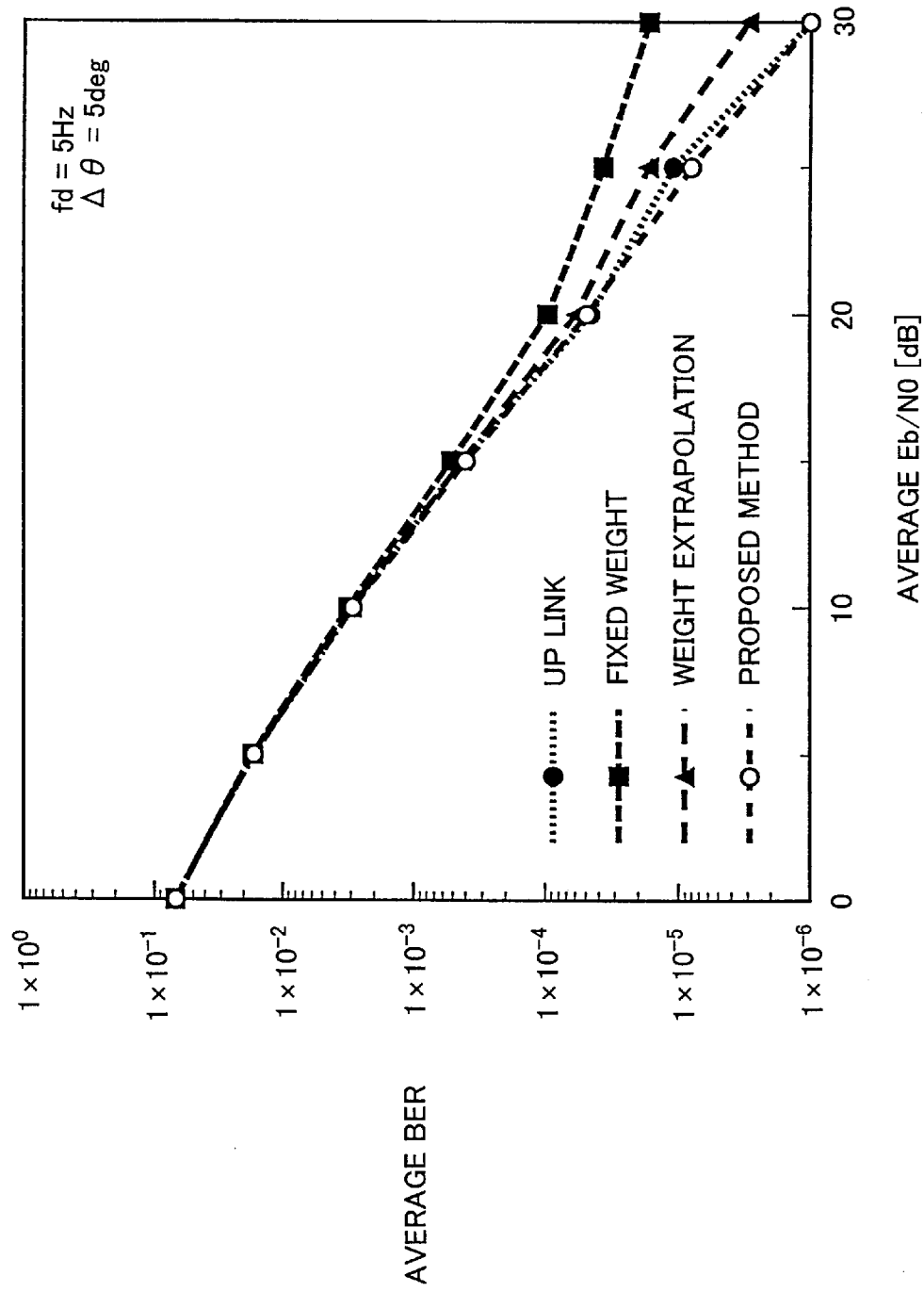
FIG. 14 shows an ideally estimated BER characteristic when maximum Doppler frequency $f_d$ is 5 Hz, where the abscissa represents average $E_b/N_0$ (ratio of average energy to noise power density per bit, represented by average $E_b/N_0$ in the figure; same in other figures), while the ordinate represents an average bit error rate (in the figure, represented by average BER; same in other figures).
Figure 15:
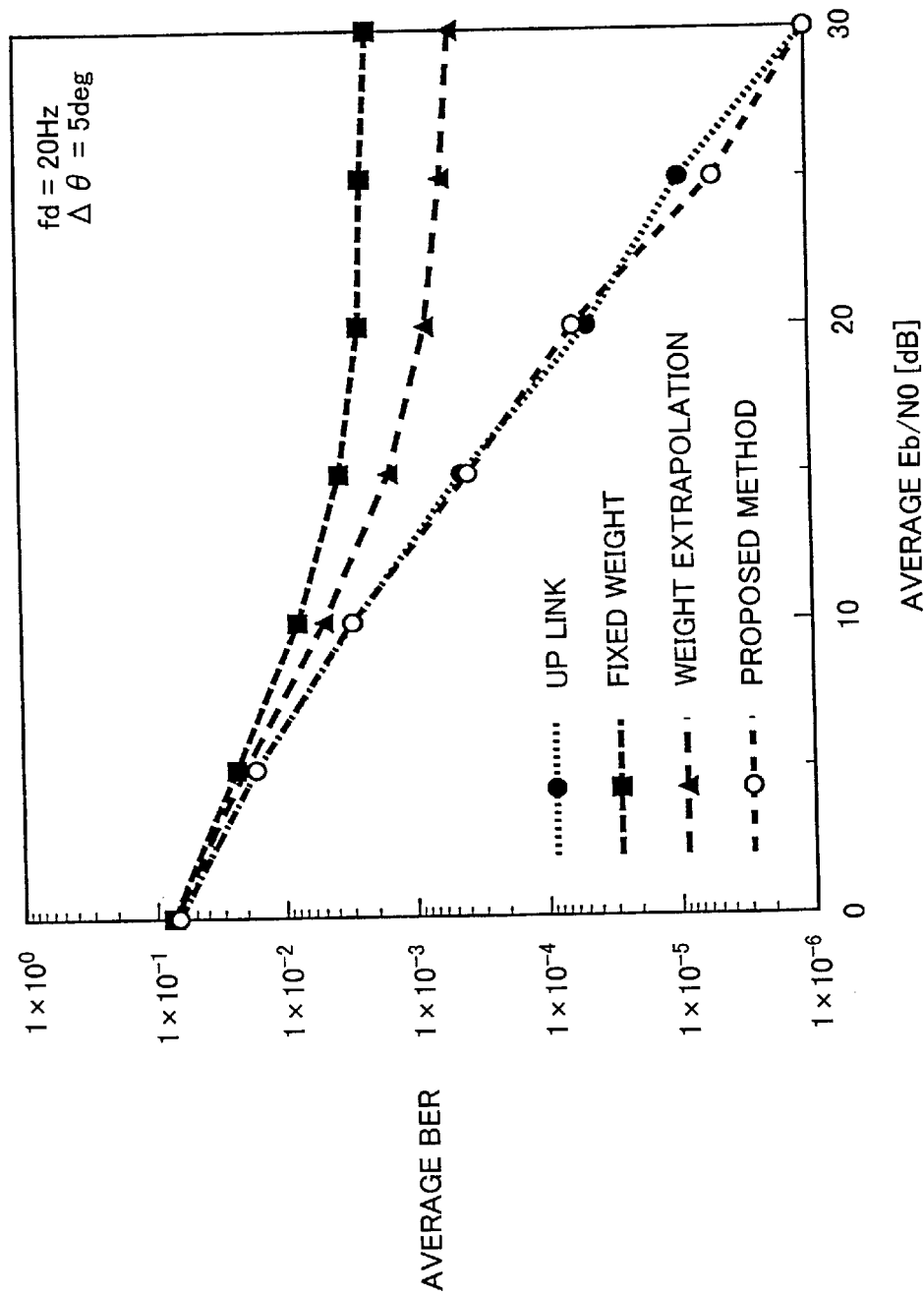
FIG. 15 represents the ideally estimated BER characteristic when the maximum Doppler frequency $f_d$ is 20 Hz.
Figure 16:
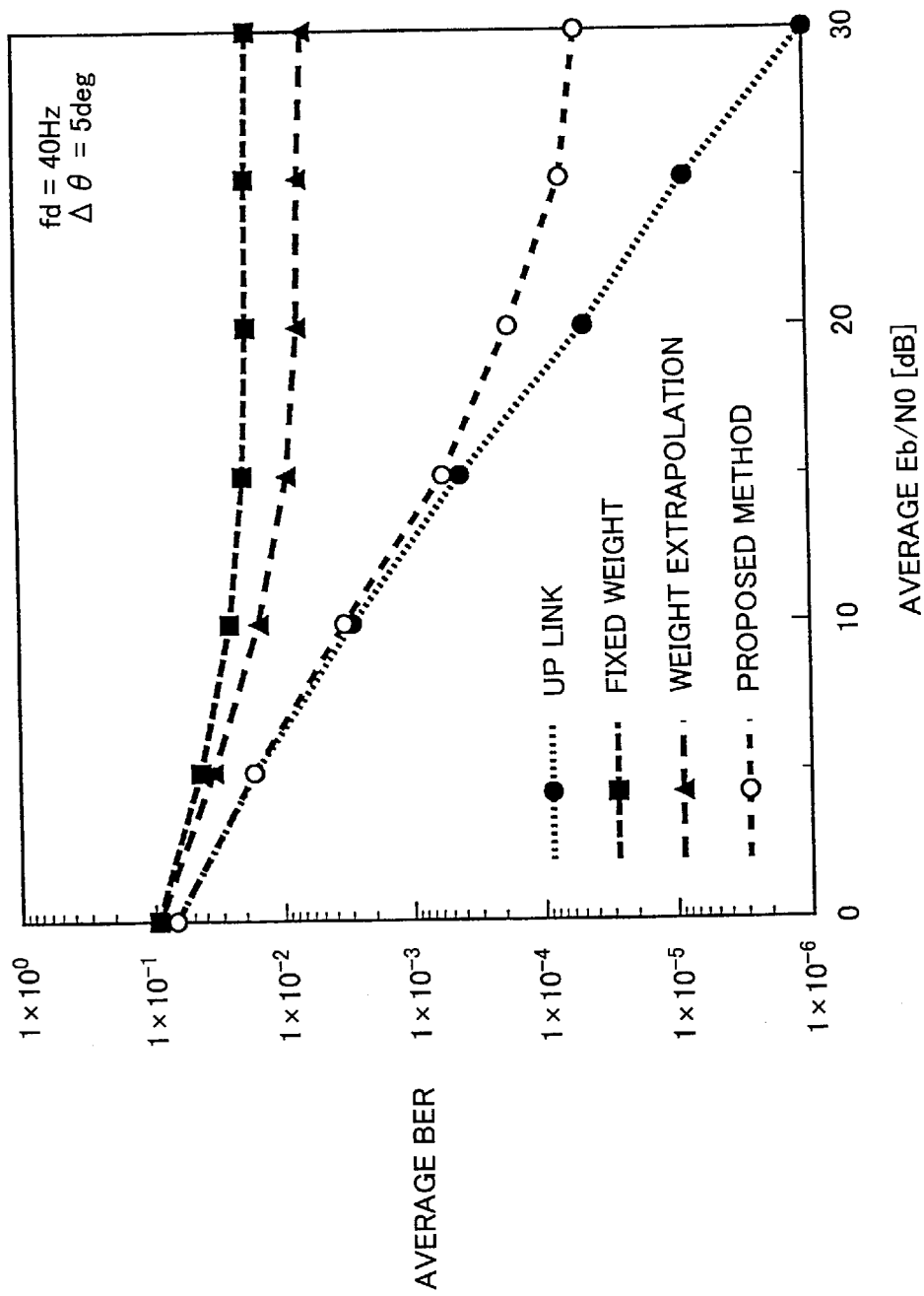
FIG. 16 represents the ideally estimated BER characteristic when the maximum Doppler frequency $f_d$ is 40 Hz.

FIGS. 14 to 16 respectively represent the ideally estimated BER characteristics when maximum Doppler frequency $f_b$ is 5 Hz, 20 Hz and 40 Hz. The angular spread Δθ is 5 deg. In FIGS. 14 to 16, the abscissa represents average $E_b/N_0$ (ratio of average energy to noise power density per bit, in the figure, represented by Average $E_b/N_0$; same in other figures), and the ordinate represents average bit error rate (in the figure, represented by Average BER; same in other figures).

According to the conventional method, BER characteristic degrades as the Doppler frequency $f_d$ increases. The difference is clearly seen when Fd=20 Hz. According to the conventional method, the result becomes flat at a high $E_b/N_0$, while according to the proposed method, characteristic approximately equal to that of the up link can be obtained. When $f_d$=40 Hz, degradation is noticed even when the proposed method is used. However, compared with the conventional method, the characteristic is better in the order of two magnitudes, where $E_b/N_0$=30 dB.

i-2) Estimation by RLS Extrapolation

Next, consider estimation by RLS extrapolation under the same condition.

Two proposed methods will be discussed, that is, an example in which RLS first order extrapolation is used (proposed method 1) and an example in which RLS first order extrapolation by regression curve is used (proposed method 2).

Figure 17:
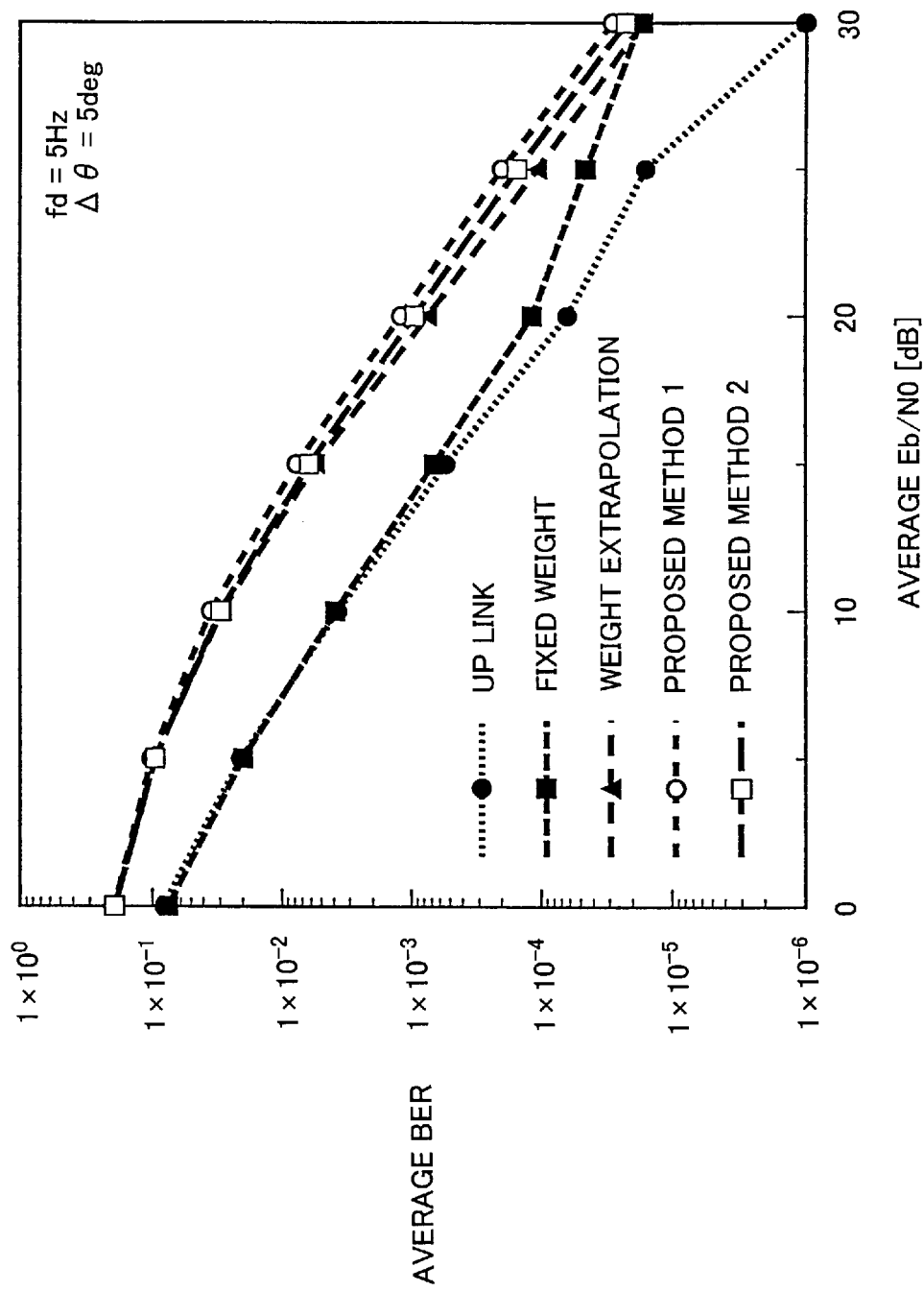
FIG. 17 represents average BER characteristic estimated by RLS extrapolation when the maximum Doppler frequency $f_d$ is 5 Hz.
Figure 18:
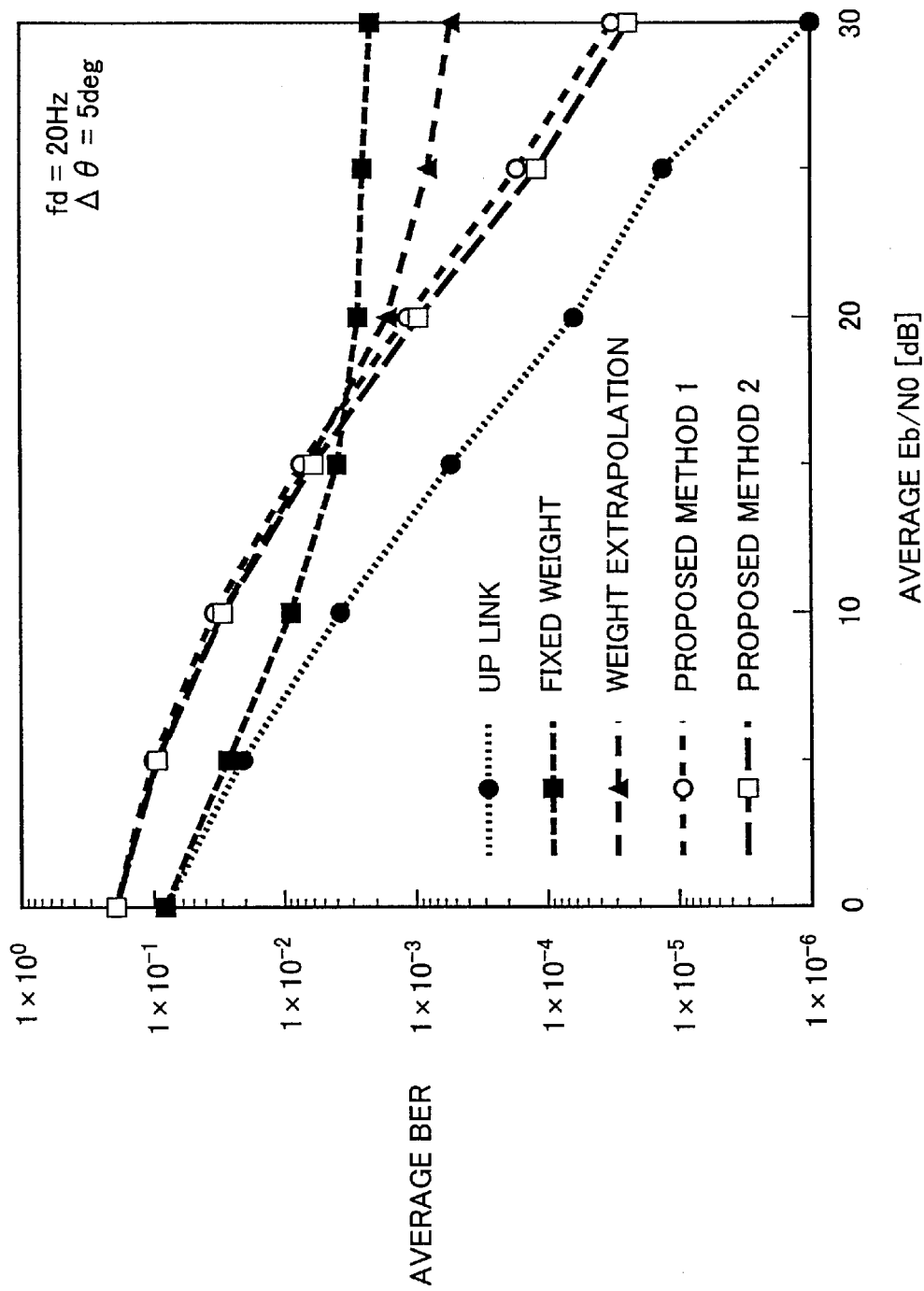
FIG. 18 represents average BER characteristic estimated by RLS extrapolation when the maximum Doppler frequency $f_d$ is 20 Hz.
Figure 19:
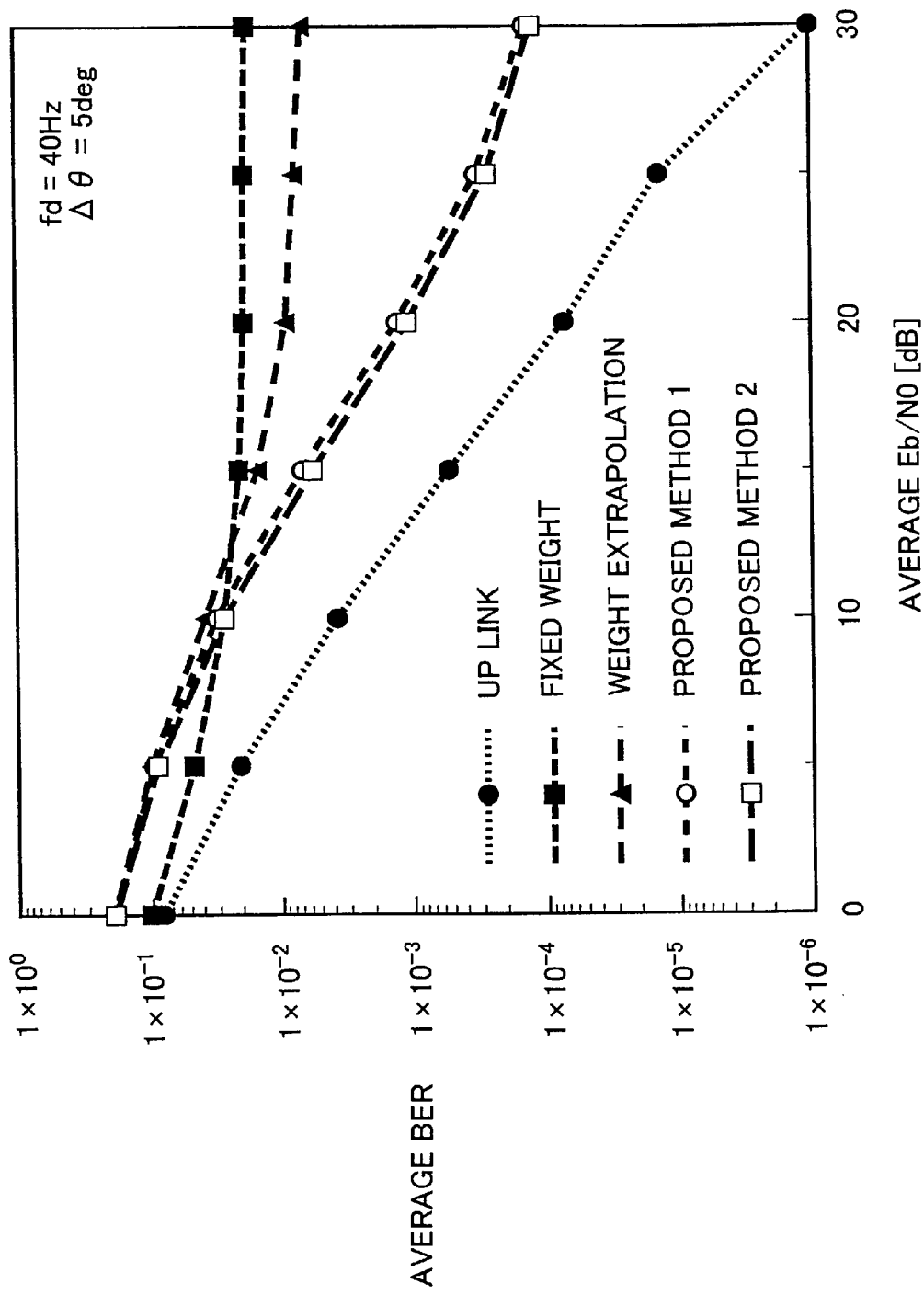
FIG. 19 represents average BER characteristic estimated by RLS extrapolation when the maximum Doppler frequency $f_d$ is 40 Hz.

FIGS. 17 to 19 represent average BER characteristics estimated by RLS extrapolation for the maximum Doppler frequency $f_d$ of 5 Hz, 20 Hz and 40 Hz, respectively. The RLS forgetting factor is set to 0.9.

When compared with the example in which ideal estimation result is used, the characteristics are approximately the same when a fixed weight is used. When weight extrapolation is used and when the proposed methods are used, average $E_b/N_o$, 7–8 dB degradation is noticed. The possible cause may be estimation error.

Particularly when $f_d$=5 Hz, the result is the worst when the proposed method is used. When $f_d$=20 Hz and 40 Hz, however, the characteristic lowers at high $E_b/N_0$ when the proposed methods are used. Therefore, as compared with the conventional method, the characteristic better in the order of 1 to 2 order of magnitude can be obtained at $E_b/N_0$=30 dB.

The proposed method 2 exhibits slightly better characteristic than the proposed method 1, and possible reason for this is that estimation error can further be suppressed by the proposed method 2.

i-3) Estimation by SMI Extrapolation

An example in which estimation by SMI extrapolation is used under the same condition will be discussed.

An example in which training symbol trains of 15 symbols are provided at the head and the tail with a data symbol train of 98 symbols in-between of the up link slot (proposed method (15)) and an example for comparison in which training symbol trains of 31 symbols are provided at the head and the tail with a data symbol train of 66 symbols in-between (proposed method) (31)) will be discussed.

The conventional method using first order extrapolation of weight will be compared with the proposed method and analyzed.

Figure 20:
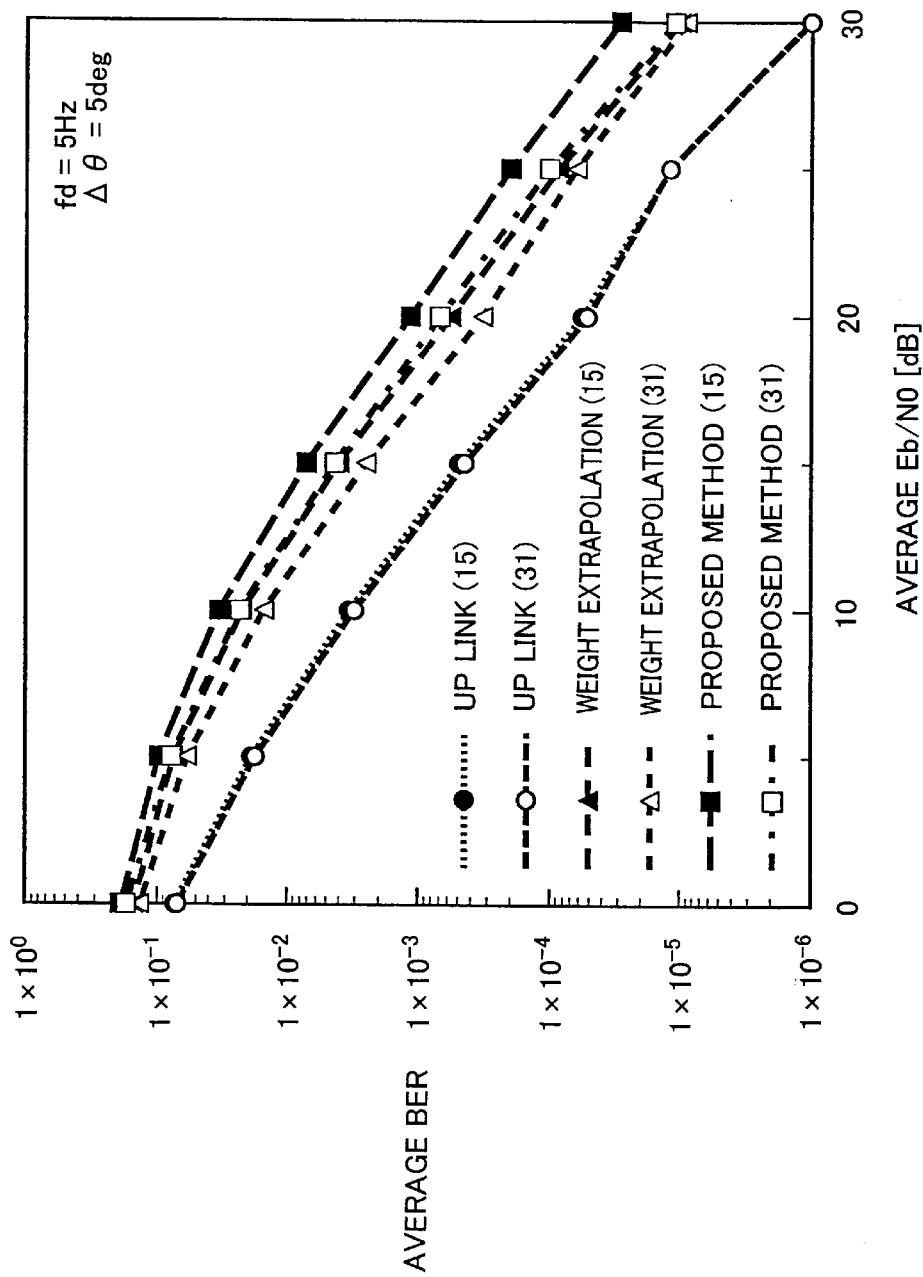
FIG. 20 represents average BER characteristic estimated by SMI extrapolation when the maximum Doppler frequency $f_d$ is 5 Hz.
Figure 21:
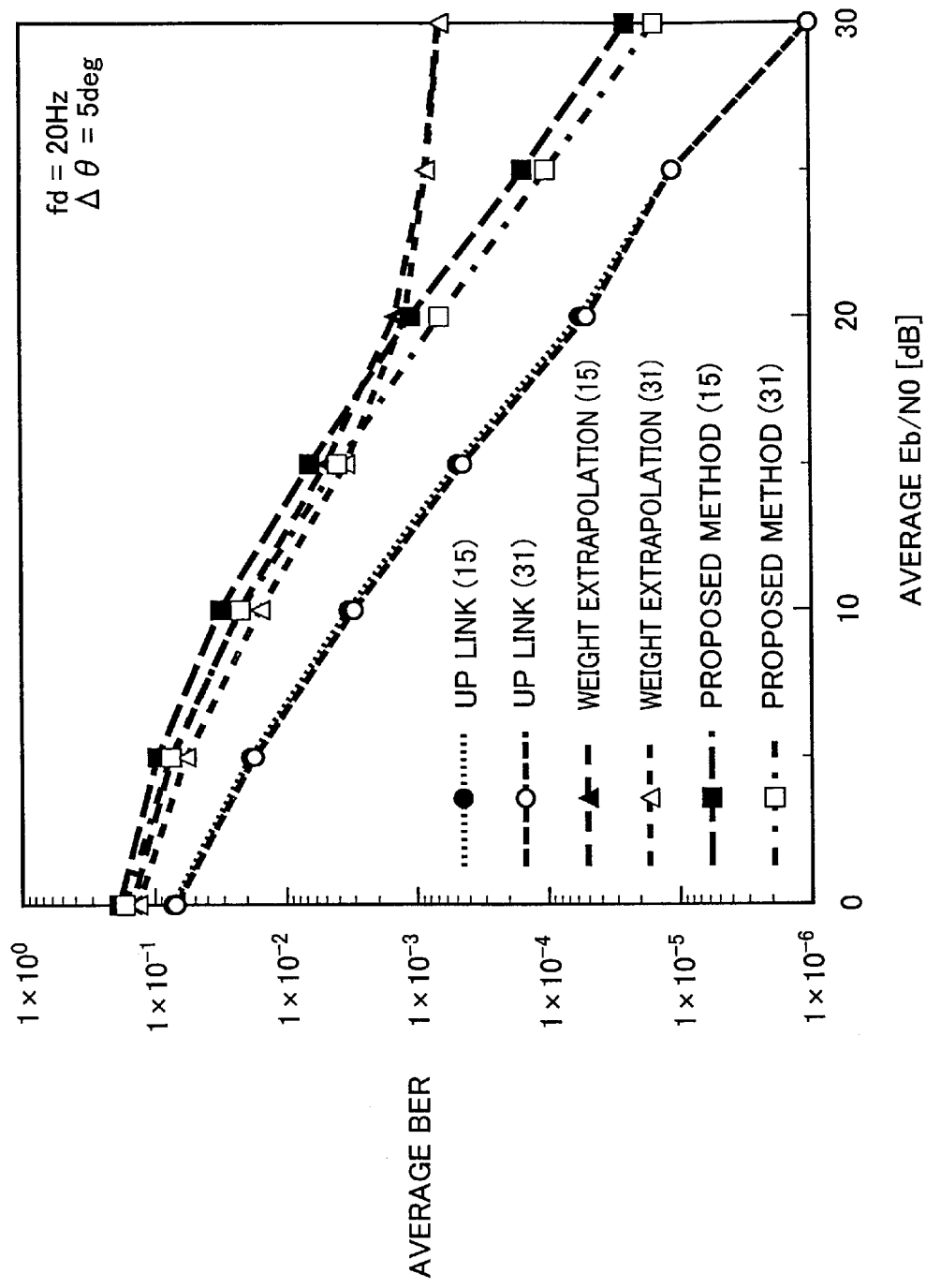
FIG. 21 represents average BER characteristic estimated by SMI extrapolation when the maximum Doppler frequency $f_d$ is 20 Hz.
Figure 22:
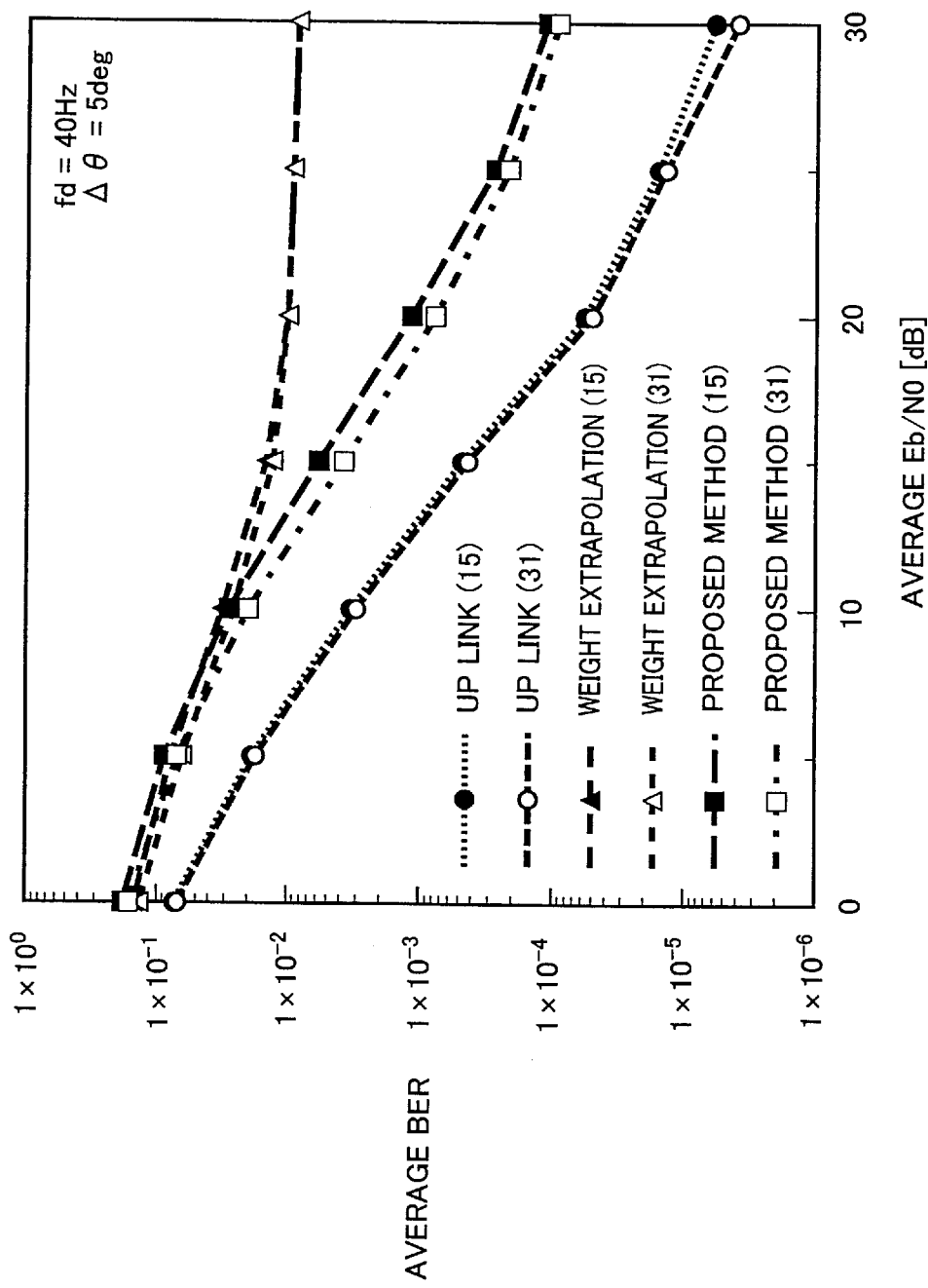
FIG. 22 represents average BER characteristic estimated by SMI extrapolation when the maximum Doppler frequency $f_d$ is 40 Hz.

FIGS. 20 to 22 represent the average BER characteristic estimated by SMI extrapolation, when maximum Doppler frequency $f_d$ is 5 Hz, 20 Hz and 40 Hz.

The numerals in parentheses represent the number of training symbols.

The characteristic is approximately the same as the estimation made by ELS extrapolation. Closely analyzed, it can be seen that the proposed method 2 of RLS is almost the same as the proposed method (15) of SMI, and the proposed method (31) of SMI is slightly better. The reason for this may be that when the number of symbols used for averaging process is larger, the influence of noise can be reduced.

ii) Characteristic With Respect to Angular Spread

The average $E_b/N_o$ is fixed at 30 dB, and the characteristics are compared with the angular spread $\Delta\theta$ being used as a parameter.

Estimation by RLS extrapolation is used as the weight estimation method. In the following analysis, an example in which a regression line of data period is used as the proposed method (proposed method 2 of RLS) is employed. For comparison, an example in which ideal estimation is performed is also discussed.

Figure 23:
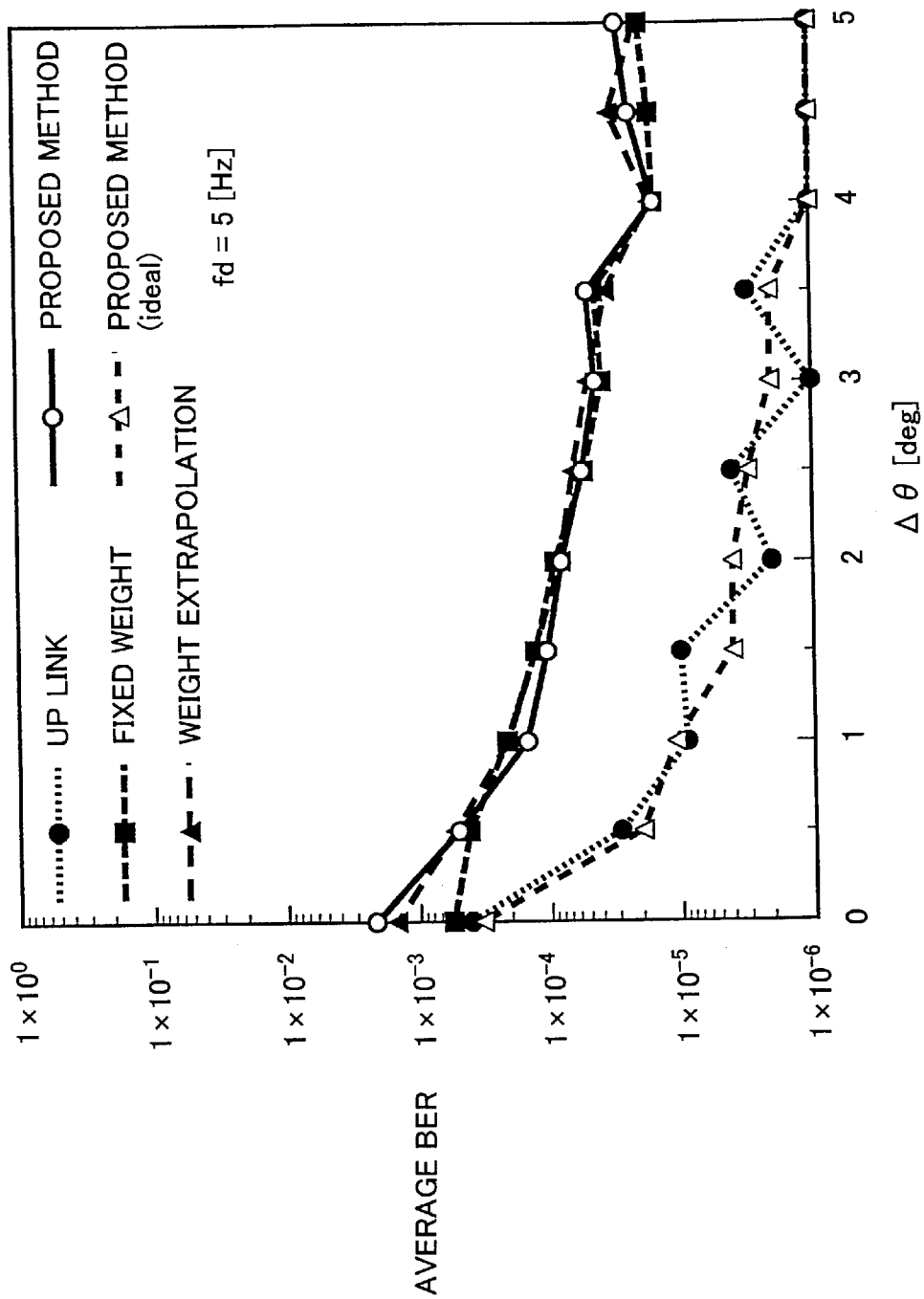
FIG. 23 represents average BER characteristic with respect to angular spread when the maximum Doppler frequency $f_d$ is 5 Hz.
Figure 24:
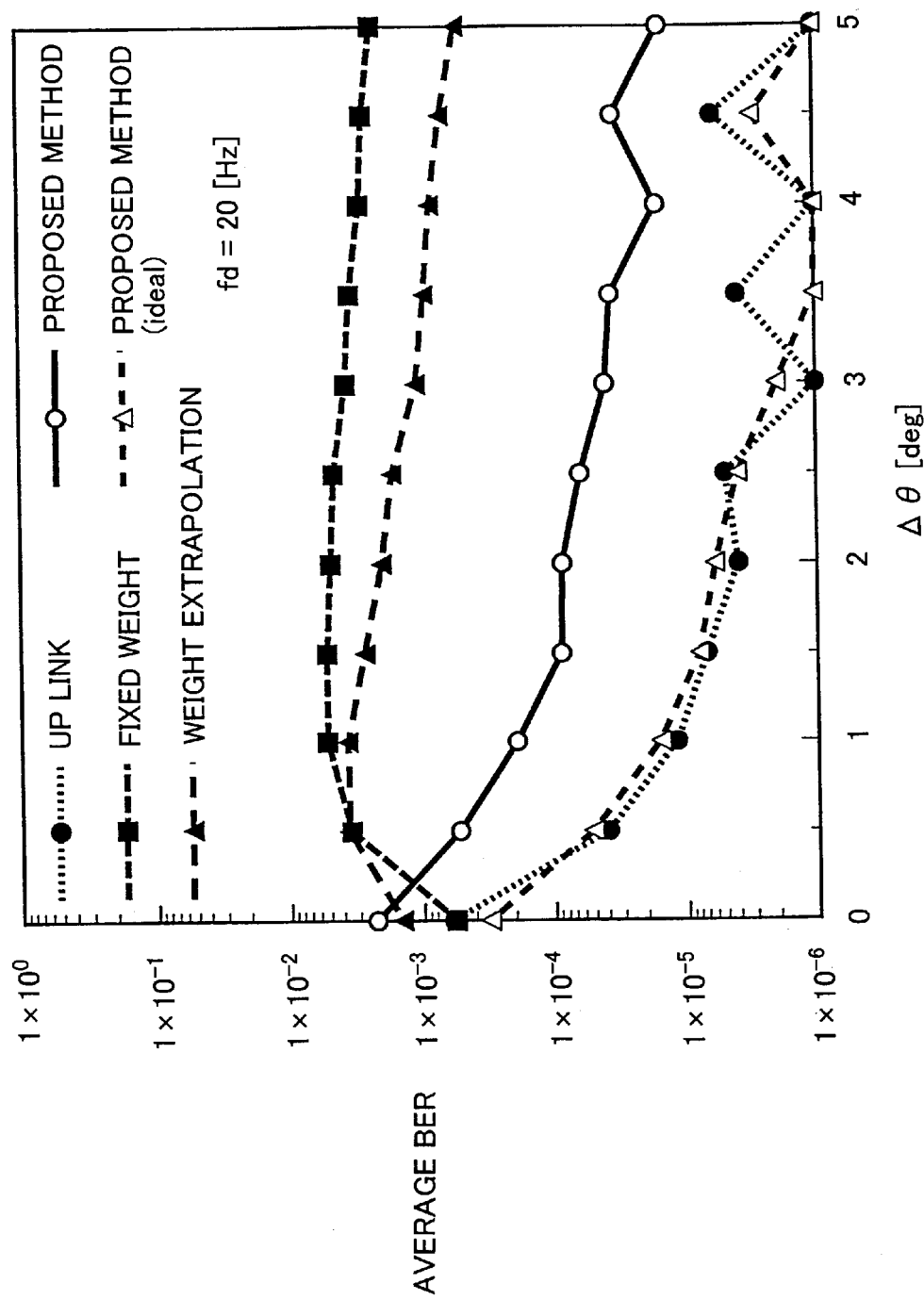
FIG. 24 represents average BER characteristic with respect to angular spread when the maximum Doppler frequency $f_d$ is 20 Hz.
Figure 25:
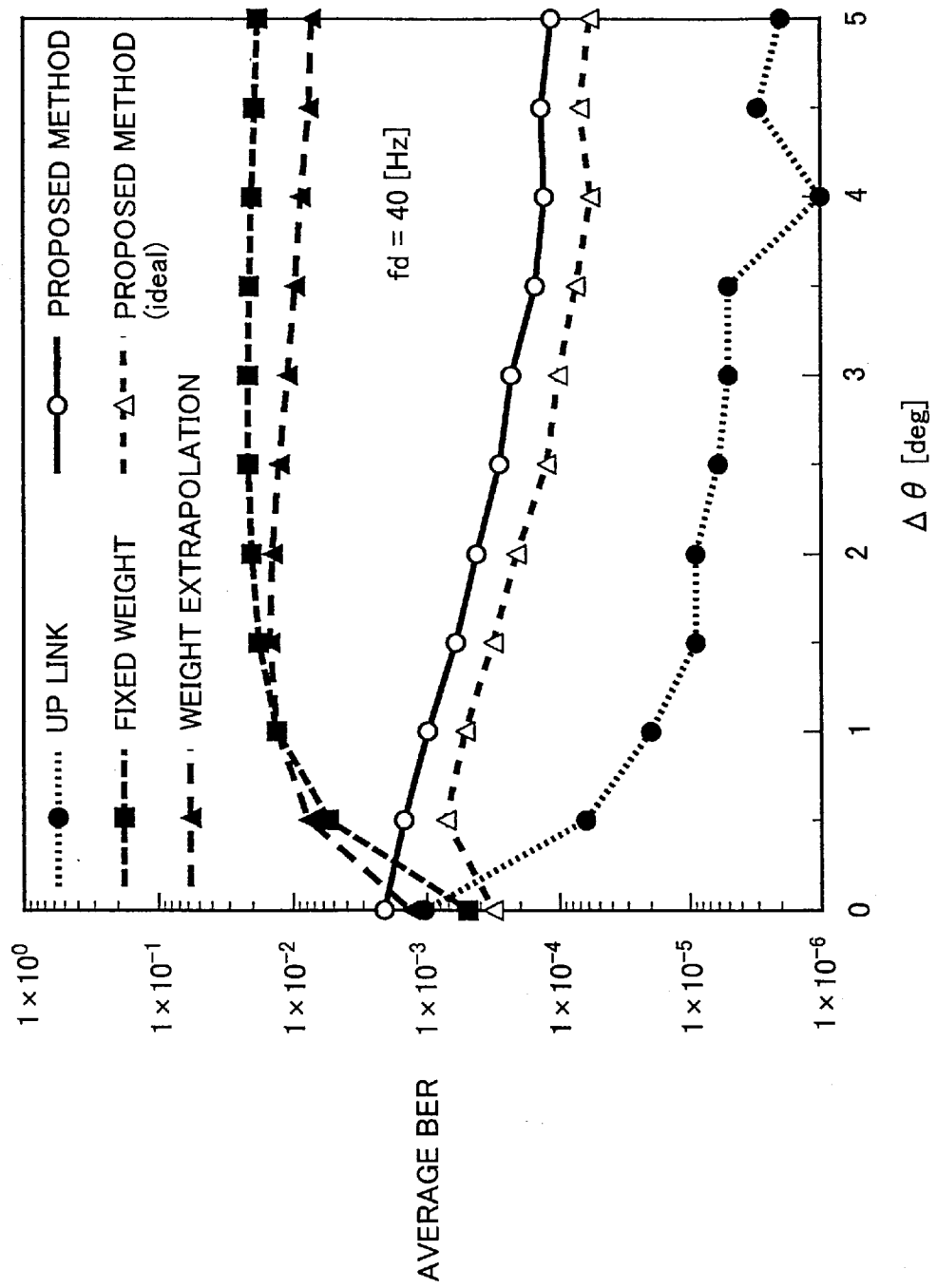
FIG. 25 represents average BER characteristic with respect to angular spread when the maximum Doppler frequency $f_d$ is 40 Hz.

FIGS. 23 to 25 represent average BER characteristic with respect to angular spread when maximum Doppler frequency $f_d$ is 5 Hz, 20 Hz and 40 Hz.

When $f_d$=40 Hz, according to the conventional method, the characteristic degrades as $\Delta\theta$ increases. This is because the change in the optimal pattern derived from propagation variation increases, as fading correlation lowers between antenna elements as $\Delta\theta$ increases.

On the contrary, when $f_d$=5 Hz, the characteristic is improved as $\Delta\theta$ increases. The reason for this is as follows. The optimal pattern does not much change, and therefore, diversity gain can also be obtained in the down link.

When $f_d$=20 Hz, both degradation of the characteristic caused by dynamic fading and improvement of the characteristic derived from diversity gain are observed.

When the proposed method is used, the characteristic is improved as $\Delta\theta$ increases in any case, and it is understood that the diversity gain exceeds the degradation of the characteristic caused by pattern variation.

When ideal estimation is used, characteristic approximately the same as the up link can be obtained with $f_d$=5 Hz and 20 Hz.

iii) Characteristic With Respect to the Maximum Doppler Frequency

Figure 26:
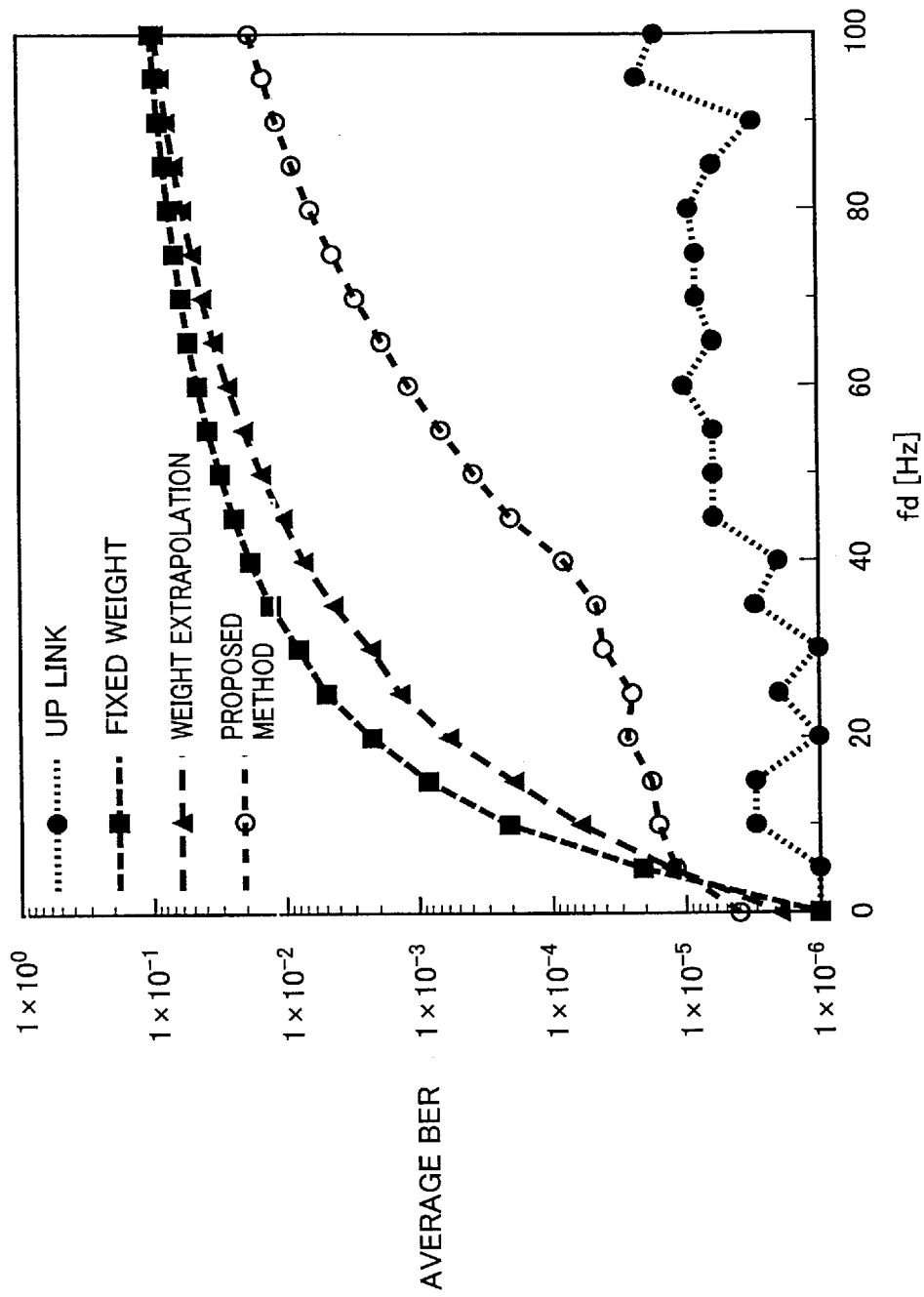
FIG. 26 represents average BER characteristic with respect to the maximum Doppler frequency $f_d$.

FIG. 26 shows the average BER characteristic with respect to the maximum Doppler frequency $f_d$. The average $E_b/N_0$ is 30 dB and $\Delta\theta$ is 5 deg. As the weight estimating method, estimation by RLS extrapolation is used. In the conventional method, the error rate degrades abruptly as $f_d$ increases. By contrast, by the proposed method, degree of degradation is small up to about $f_d$=40 Hz.

[Eighth Embodiment]

Figure 27:
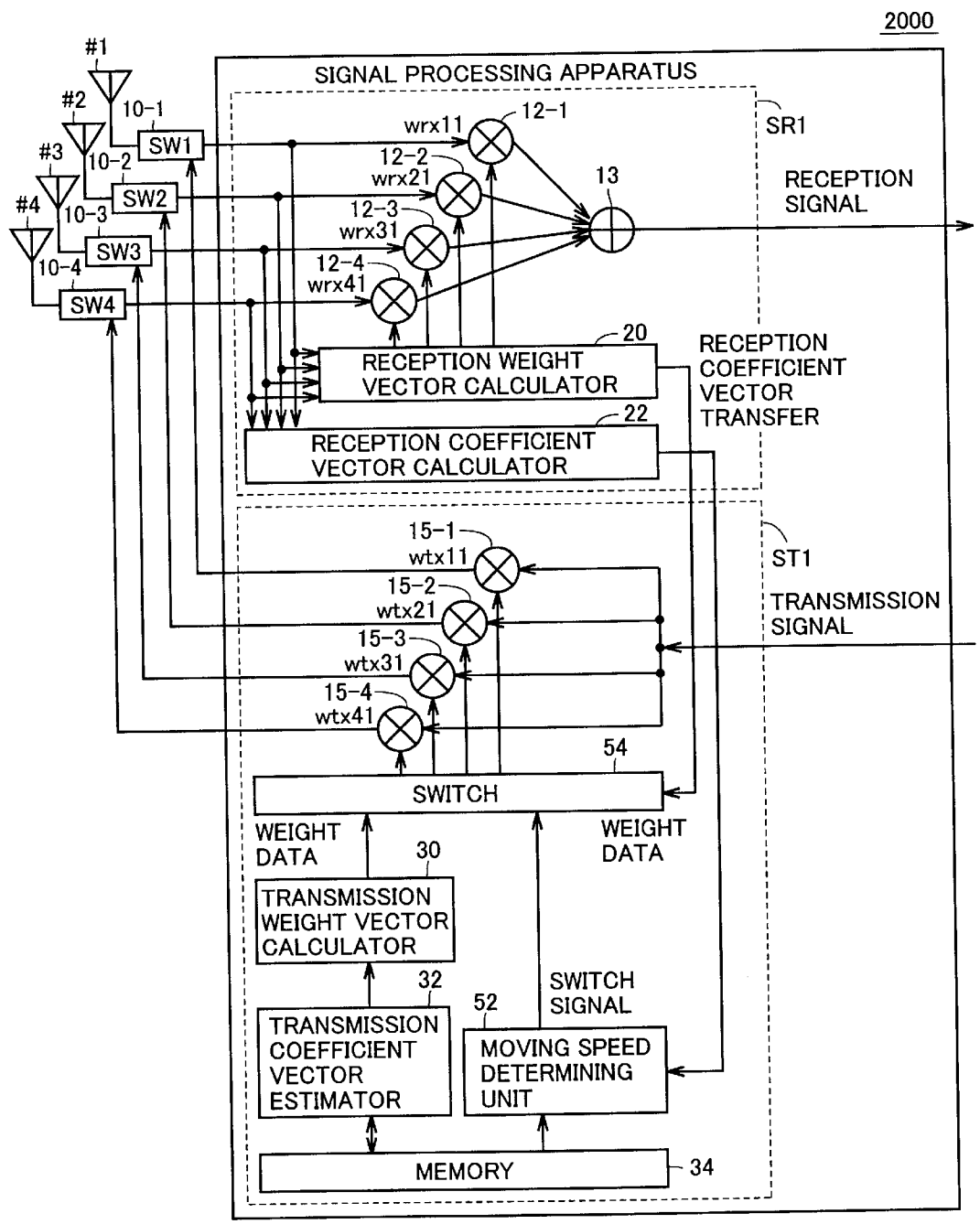
FIG. 27 is a schematic block diagram showing a configuration of a radio equipment (radio base station) 2000 for a PDMA base station in accordance with an eighth embodiment of the present invention.

FIG. 27 is a schematic block diagram showing a configuration of a radio equipment (radio base station) for the PDMA base station in accordance with the eighth embodiment of the present invention.

The configuration is different from the configuration of the radio equipment (radio base station) 1000 in accordance with the first embodiment shown in FIG. 1 in that it additionally includes a moving speed determining unit 52 receiving an output from reception coefficient vector calculator 22 and determining speed of movement of the user terminal, and a switch 54 receiving an output of the reception weight vector calculator 20 and an output of transmission weight vector calculator 30 and selectively applying the same to multipliers 15-1 to 15-4 in accordance with the result of determination by moving speed determining unit 52. Except this point, the configuration is the same as the radio equipment (radio base station) in accordance with any of the first to seventh embodiments.

Figure 32:
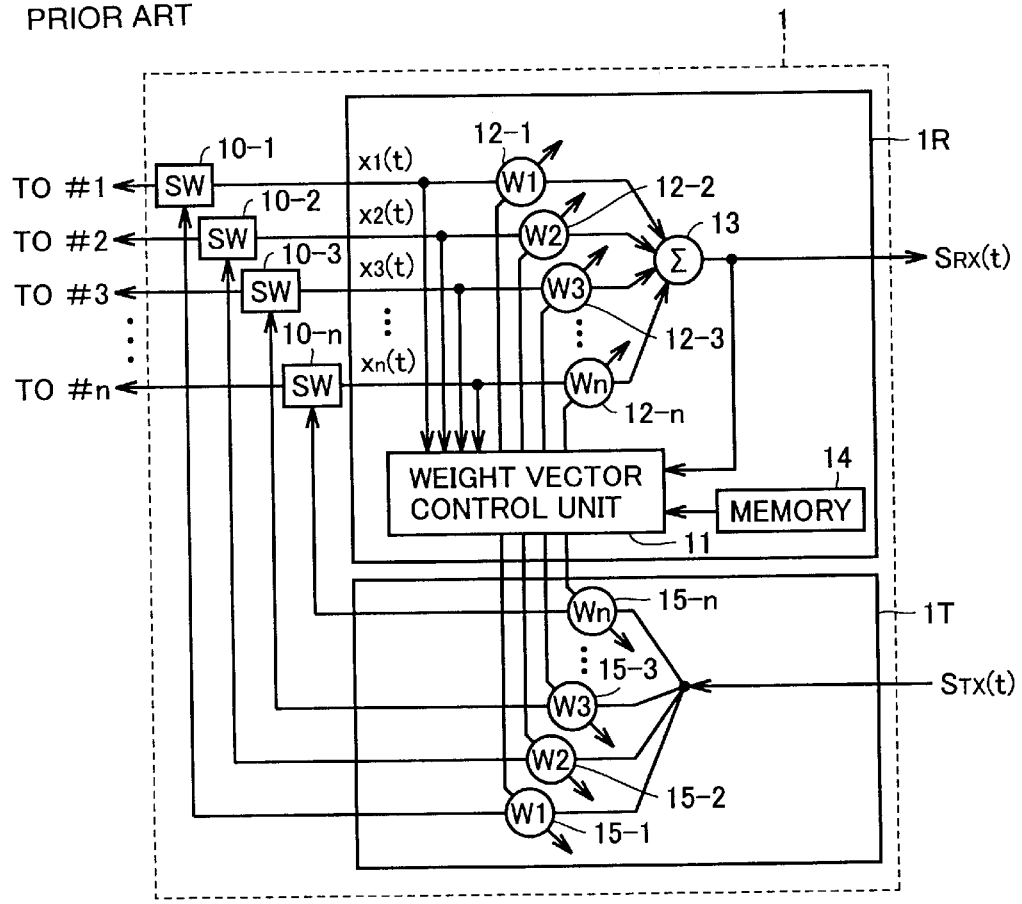
FIG. 32 is a schematic block diagram representing a configuration of an adaptive array radio base station.
Figure 33:
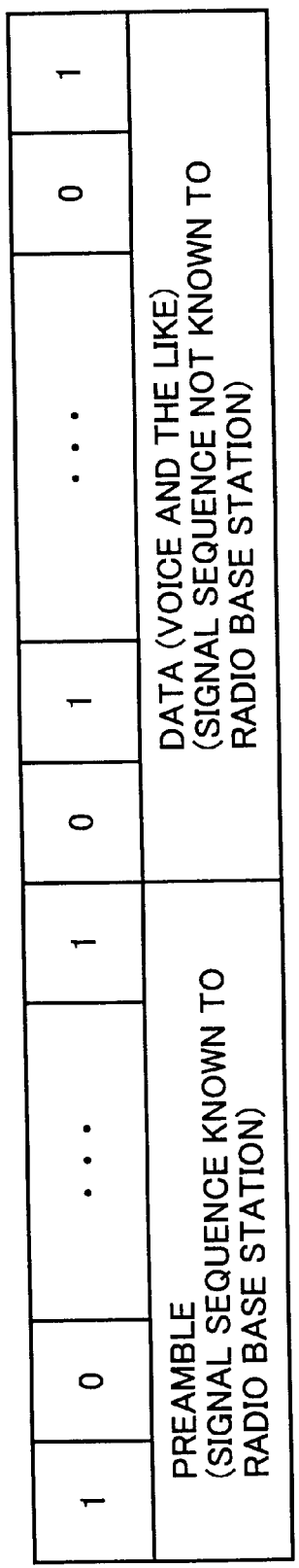
FIG. 33 is a schematic diagram representing a frame configuration of radio signals of a portable telephone.
Figure 34:
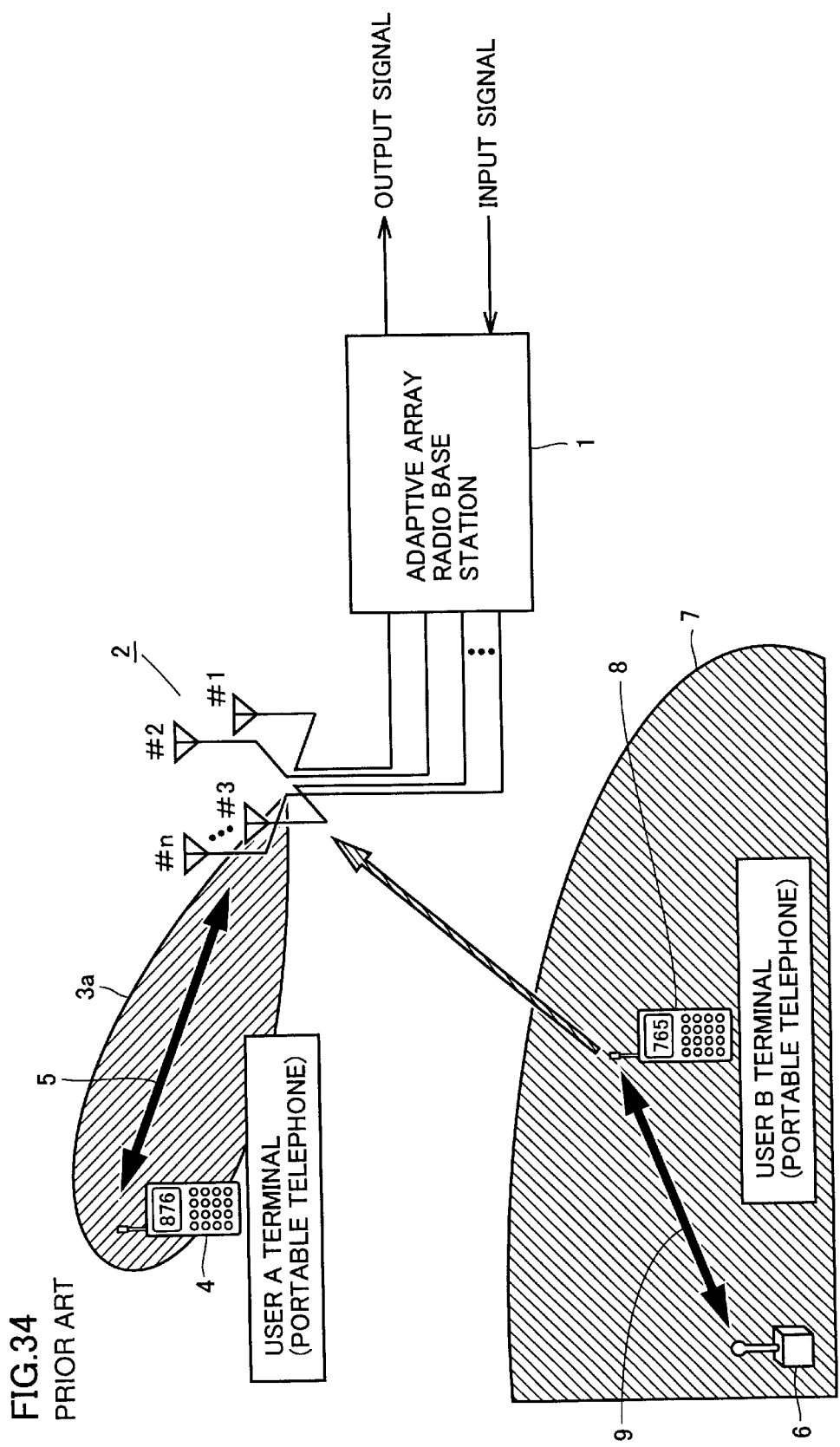
FIG. 34 is an illustration representing transmission/reception of radio signals between an adaptive array radio base station and a user.

More specifically, as already described, in a range where the speed of movement of the user terminal is small, it may be better not to perform such a prediction but to use the reception weight vector directly as the transmission weight vector as in the conventional configuration shown in FIG. 32, because of the prediction error in the process of estimating the propagation path and prediction of propagation path.

Therefore, in the radio equipment 2000 in accordance with the eighth embodiment, when it is determined by the moving speed determining unit 52 that the terminal is moving at a speed slower than a predetermined speed of movement, switch 54 switches so that the reception weight vector is directly applied to multipliers 15-1 to 15-4. When it is determined by the moving speed determining unit 52 that the terminal is moving at a speed faster than the predetermined speed of movement, switch 54 switches so that the output of transmission weight vector calculator 30 is applied to multipliers 15-1 to 15-4. By this configuration, it becomes possible to realize data transmission with low error rate over a wide range of the speed of movement of the terminal.

[Ninth Embodiment]

Figure 28:
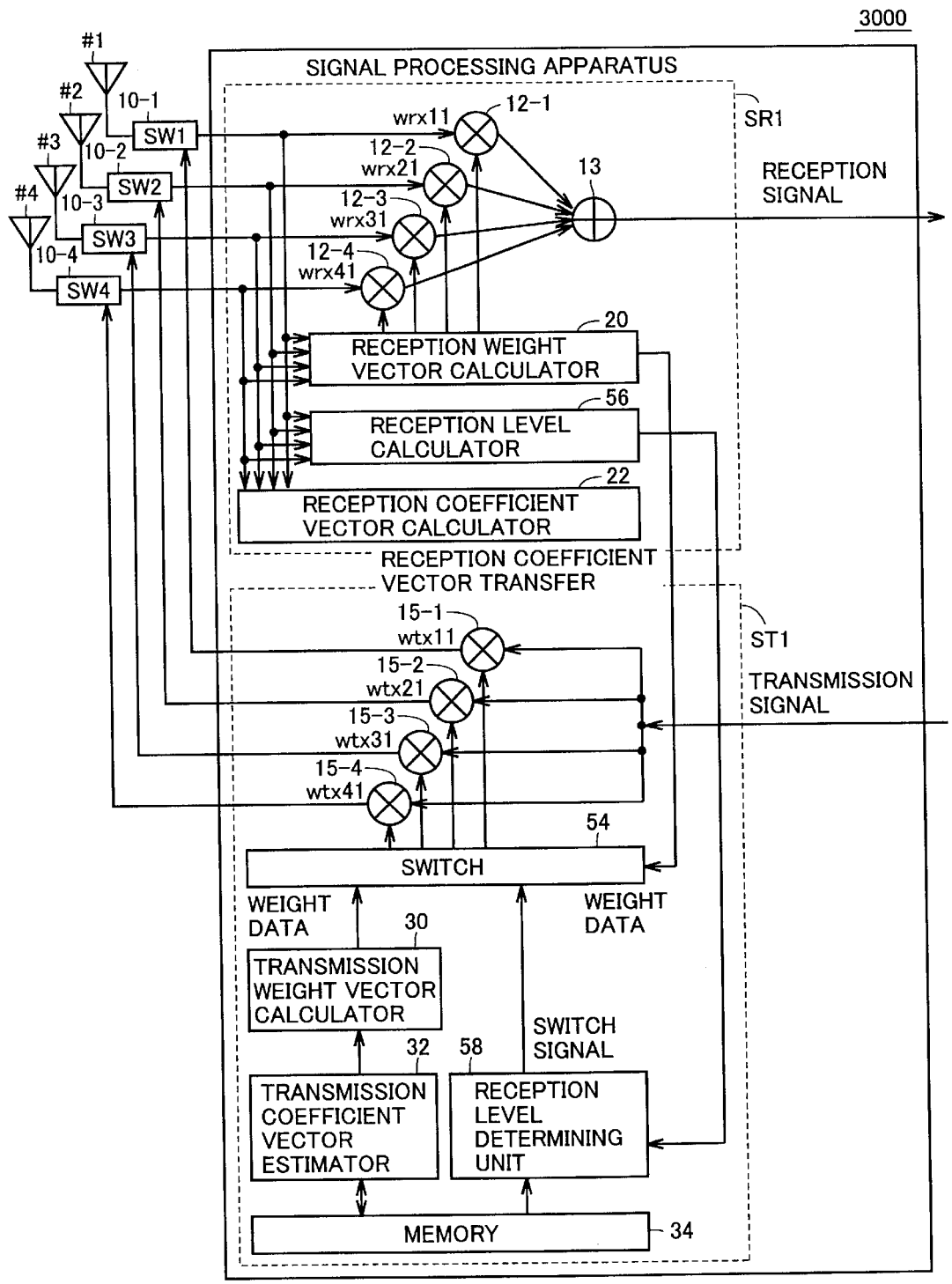
FIG. 28 is a schematic block diagram showing a configuration of a radio equipment (radio base station) 3000 for a PDMA base station accordance with a ninth embodiment of the present invention.

FIG. 28 is a schematic block diagram showing a configuration of a radio equipment (radio base station) 3000 for the PDMA base station in accordance with the ninth embodiment of the present invention.

The configuration is different from the configuration of radio equipment 1000 in accordance with the first embodiment of the present invention shown in FIG. 1 in that it further includes a reception level calculator 56 receiving signals from array antennas #1 to #4 and calculating a level of a reception signal, a reception level determining unit 58 receiving an output from reception level calculator 56 and determining reception level of the user terminal, and a switch 54 receiving an output of reception weight vector calculator 20 and an output of transmission weight vector calculator 30 and selectively applying the same to multipliers 15-1 to 15-4 in accordance with the result of determination of reception level determining unit 56. Except this point, the configuration is the same as the radio equipment in accordance with any of the first to seventh embodiments.

More specifically, in a range where the reception signal level from the user terminal is small, it may be better not to perform such a prediction but to use the reception weight vector directly as the transmission weight vector as in the conventional configuration shown in FIG. 32, because of the prediction error in the process of estimating the propagation path and predicting the propagation path.

Therefore, in the radio equipment 3000 in accordance with the ninth embodiment, when it is determined by the reception level determining unit 58 that the level of the reception signal from the terminal is lower than a predetermined reception level, switch 54 switches so that the reception weight vector is directly applied to multipliers 15-1 to 15-4. When it is determined by the reception level determining unit 58 that the level of the reception signal from the terminal is higher, the switch 54 switches so that the output of transmission weight vector calculator 30 is applied to multipliers 15-1 to 15-4.

By the above described structure, it becomes possible to realize data transmission with low error rate over a wide range of the reception signal level.

The reception signal level from user PS1, for example, can be calculated from the reception coefficient vector in accordance with the following equation.

$$P_1 = H_1^2/N = (h_{11}^2 + h_{21}^2 + h_{31}^2 + h_{41}^2)N \quad (32)$$

The same applies to the reception signal level from other users.

[Tenth Embodiment]

Figure 29:
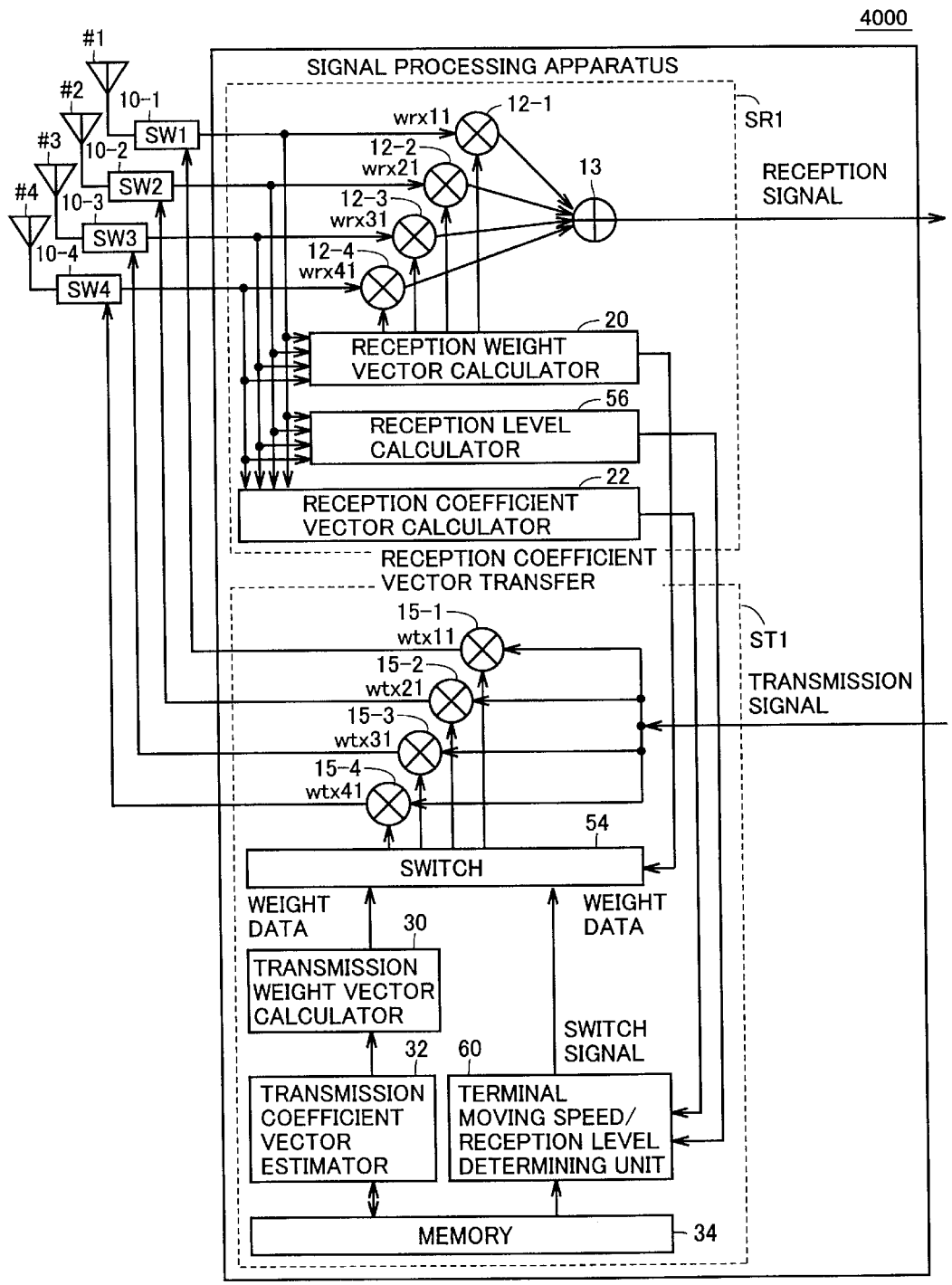
FIG. 29 is a schematic block diagram showing a configuration of a radio equipment (radio base station) 4000 for a PDMA base station in accordance with a tenth embodiment of the present invention.
Figure 30:
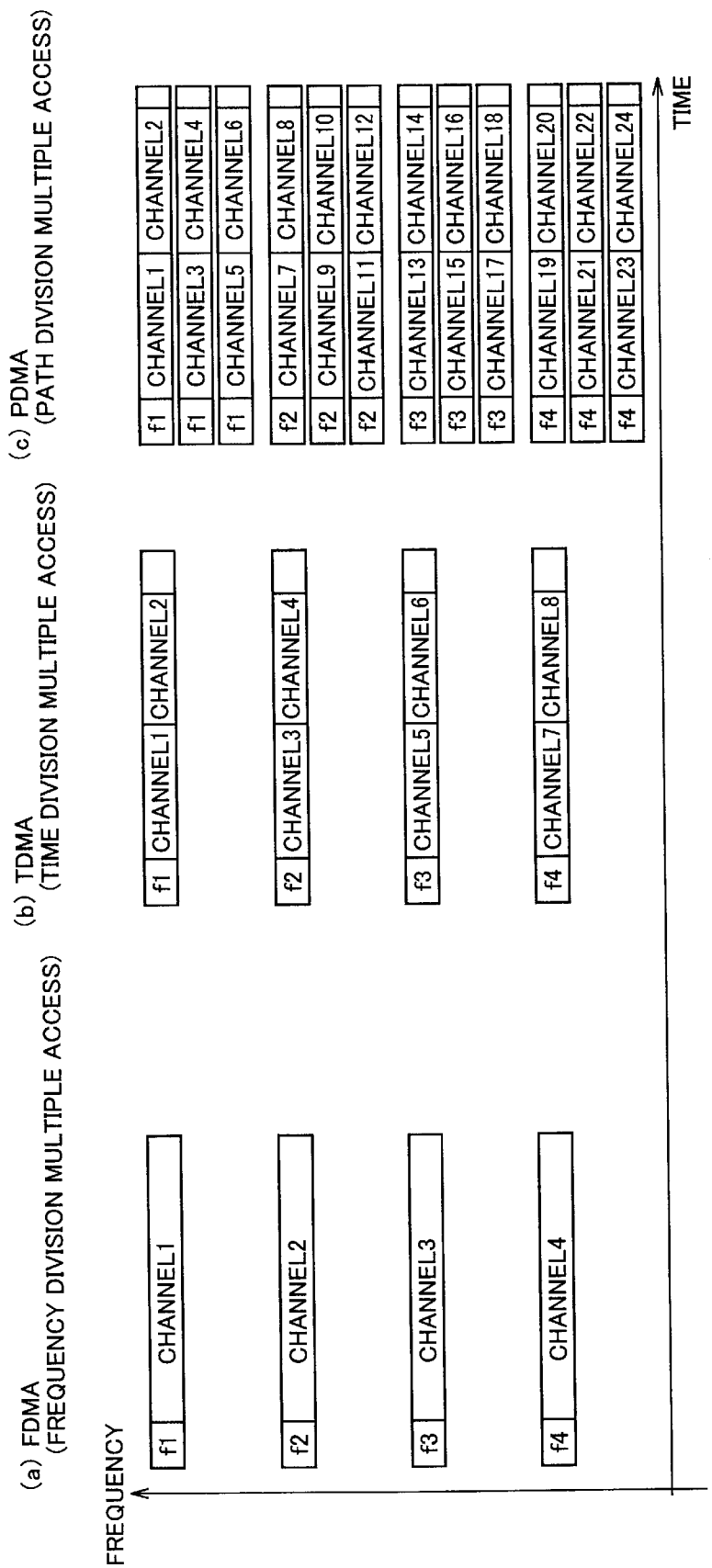
FIG. 30 shows an arrangement of channels in various communication systems including frequency division multiple access, time division multiple access and Path Division Multiple Access (PDMA).
Figure 31:
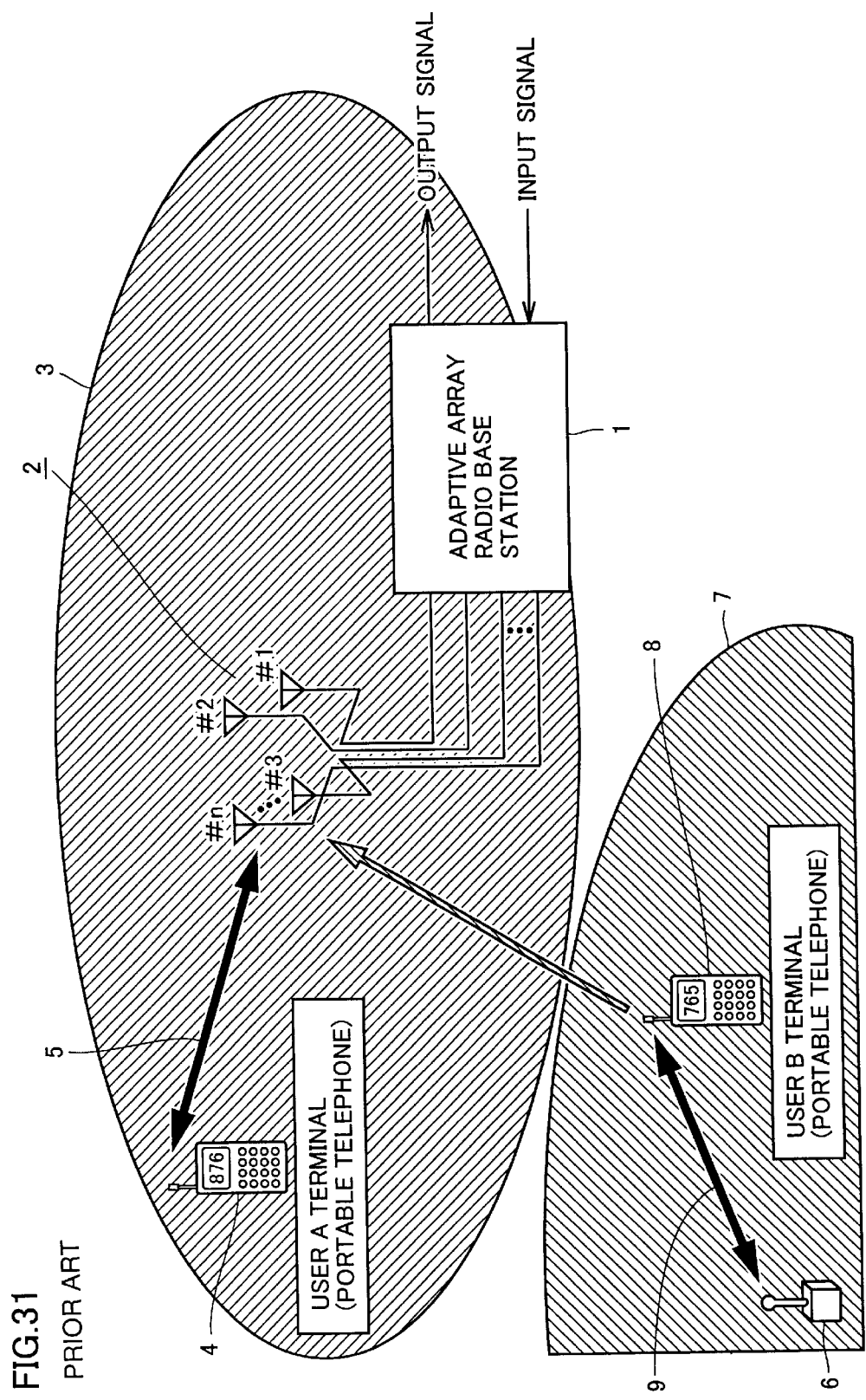
FIG. 31 is a schematic diagram representing a basic operation of an adaptive array radio base station.

FIG. 29 is a schematic block diagram representing a configuration of a radio equipment (radio base station) 4000 for PDMA base station in accordance with the tenth embodiment of the present invention.

The configuration is different from the configuration of the radio equipment (radio base station) 3000 in accordance with the ninth embodiment of the present invention shown in FIG. 28 in that the reception level determining unit 58 is replaced by a terminal moving speed determining/reception level determining unit 60, which has, in addition to the function of determining the reception level, the function of determining speed of movement similar to that of the moving speed determining unit 52 in accordance with the eighth embodiment. Except this point, the configuration is the same as the radio equipment (radio base station) 3000 in accordance with the ninth embodiment.

By the above described configuration, it becomes possible to realize data transmission with low error rate over a wide range of the speed of movement and wide range of reception signal level of the mobile terminal.

It should be considered that the embodiments disclosed herein are in every point illustrative only and not limiting. The scope of the invention is represented not by the descriptions above but by the claims, and all the modifications within the scope of the claims and equivalents thereof are covered.

As described above, according to the present invention, time change of the reception coefficient vector of the adaptive array is estimated to indirectly estimate weight variation, so that even in a dynamic Raleigh propagation path with angular spread, for example, degradation of error rate in the down link generated by the time difference between up and down links can be suppressed.

Further, according to the present invention, data transmission with low error rate becomes possible over a wide range of the speed of movement and/or wide range of reception signal level of a mobile terminal.

What is claimed is:

1. A radio equipment changing antenna directivity on real time basis and transmitting/receiving signals to/from a plurality of terminals by time division of said signal into a plurality of slots, comprising:

a plurality of antennas arranged in a discrete manner; and a transmission circuit and a reception circuit sharing said plurality of antennas for transmitting/receiving signals; wherein said reception circuit includes a reception signal separating circuit for separating a signal from a specific terminal among said plurality of terminals, based on signals from said plurality of antennas, when a reception signal is received, and a reception propagation path estimating circuit estimating a propagation path from said specific terminal based on signals from said plurality of antennas, when said reception signal is received;

said transmission circuit includes a transmission propagation path estimating circuit predicting a propagation path when a transmission signal is transmitted, based on a result of estimation by said reception propagation path estimating circuit, and a transmission directivity control circuit updating said antenna directivity when said transmission signal is transmitted, based on the result of estimation by said transmission propagation path estimating circuit; wherein each said slot includes a first data area of a first prescribed size provided in said slot so as to distinguish transmission/reception to/from said specific terminal, and a second data area of a second prescribed size provided in an area succeeding and apart by a prescribed interval from said first data area, in said slot to distinguish transmission/reception to/from said specific terminal;

said reception propagation path estimating circuit provides the first estimation value and a second estimation value of said specific terminal based on data in said first and second data areas, respectively; and said transmission propagation path estimating circuit predicts propagation path when said transmission signal is transmitted, by extrapolating said first and second estimation values.

2. The radio equipment according to claim 1, wherein said first data area includes a first training data area, and said second data area includes a second training data area.

3. The radio equipment according to claim 2, wherein said first training data area is provided at a head of said slot, and said second training data area is provided at a tail of said slot.

4. The radio equipment according to claim 3, wherein said reception propagation path estimating circuit provides a first reception coefficient vector and a second reception coefficient vector corresponding to an impulse response of said specific terminal of the propagation path from said specific terminal, based on the data of said first and second training data areas, respectively.

5. The radio equipment according to claim 4, wherein said reception propagation path estimating circuit provides said first reception coefficient vector and said second reception coefficient vector, by ensemble average of each of the signals received by said plurality of antennas and a signal from said specific terminal separated by said reception signal separating circuit.

6. The radio equipment according to claim 1, wherein the reception signal separating circuit includes
a reception weight vector calculating unit receiving reception signals from said plurality of antennas and providing, on real time basis, a reception weight vector for separating a signal from said specific terminal,
a plurality of first multipliers each receiving at one input reception signals from said plurality of antennas respectively, and receiving corresponding element of said reception weight vector respectively at the other input, and
an adder adding signals from said plurality of multipliers; and
said transmission directivity control circuit includes
a transmission weight vector calculating unit providing a transmission weight vector based on a result of estimation from said transmission propagation path estimating circuit, and
a plurality of second multipliers each receiving at one input a transmission signal, and receiving said transmission weight vector at the other input and applying to said plurality of antennas respectively.

7. A radio equipment changing antenna directivity on real time basis and transmitting/receiving signals to/from a plurality of terminals by time division of said signal into a plurality of slots, comprising:
a plurality of antennas arranged in a discrete manner; and
a transmission circuit and a reception circuit sharing said plurality of antennas for transmitting/receiving signals; wherein
said reception circuit includes
a reception signal separating circuit for separating a signal from a specific terminal among said plurality of terminals, based on signals from said plurality of antennas, when a reception signal is received, and
a reception propagation path estimating circuit estimating a propagation path from said specific terminal based on signals from said plurality of antennas, when said reception signal is received;
said transmission circuit includes a transmission propagation path estimating circuit predicting a propagation path when a transmission signal is transmitted, based on a result of estimation by said reception propagation path estimating circuit, and
a transmission directivity control circuit updating said antenna directivity when said transmission signal is transmitted, based on the result of estimation by said transmission propagation path estimating circuit; wherein
each said slot includes
a training data area provided within said slot and having a prescribed number of training data, and
a data area provided successive to said training data area and having a plurality of data each representing information to be transmitted/received;
said reception propagation path estimating circuit provides a first estimation value and a second estimation value of the propagation path from said specific terminal, based on data of said training data area and said data area, respectively; and
said transmission propagation path estimating circuit predicts propagation path when said transmission signal is transmitted, by extrapolation of said first and second estimation values.

8. The radio equipment according to claim 7, wherein said training data area is provided at a head of said slot.

9. The radio equipment according to claim 7, wherein said reception propagation path estimating circuit successively provides a first reception coefficient vector and a second reception coefficient vector corresponding to impulse response of said specific terminal of the propagation path from said specific terminal, based on a plurality of data in said training data area and said data area.

10. The radio equipment according to claim 9, wherein said first reception coefficient vector and said reception coefficient vector are successively derived by steepest descent method.

11. The radio equipment according to claim 9, wherein said first reception coefficient vector and said second reception coefficient vector are successively derived by recursive least square method.

12. A radio equipment changing antenna directivity on real time basis and transmitting/receiving signals to/from a plurality of terminals by time division of said signal into a plurality of slots, comprising:
a plurality of antennas arranged in a discrete manner; and
a transmission circuit and a reception circuit sharing said plurality of antennas for transmitting/receiving signals; wherein
said reception circuit includes
a reception signal separating circuit for separating a signal from a specific terminal among said plurality of terminals, based on signals from said plurality of antennas, when a reception signal is received, and
a reception propagation path estimating circuit estimating a propagation path from said specific terminal based on signals from said plurality of antennas, when said reception signal is received;
said transmission circuit includes a transmission propagation path estimating circuit predicting a propagation path when a transmission signal is transmitted, based on a result of estimation by said reception propagation path estimating circuit, and a transmission directivity control circuit updating said antenna directivity when said transmission signal is transmitted, based on the result of estimation by said transmission propagation path estimating circuit; wherein each said slot includes a training data area provided within the slot and having a prescribed number of training data, and a data area provided successive to said training data area and having a plurality of data each representing information to be transmitted/received;

said reception propagation path estimating circuit provides a plurality of estimation values of the propagation path from said specific terminal, based on the data of said training data area and said data area, respectively; and said transmission propagation path estimating circuit regresses said plurality of estimation values and predicts propagation path when said transmission signal is transmitted, by extrapolation based on a result of regression.

13. The radio equipment according to claim 12, wherein said training data area is provided at a head of said slot.

14. The radio equipment according to claim 12, wherein said reception transmission path estimating circuit successively provides a plurality of reception coefficient vectors corresponding to impulse response from said specific terminal of the propagation path from said specific terminal, based on a plurality of data in said training data area and said data area.

15. The radio equipment according to claim 14, wherein said plurality of reception coefficient vectors are successively provided by steepest descent method.

16. The radio equipment according to claim 14, wherein said plurality of reception coefficient vectors are successively provided by recursive least square method.

17. A radio equipment changing antenna directivity on real time basis and transmitting/receiving signals time divisionally to/from a plurality of terminals, comprising:

a plurality of antennas arranged in a discrete manner; and a transmission circuit and a reception circuit sharing said plurality of antennas for transmitting/receiving signals; wherein said reception circuit includes a reception signal separating circuit for separating a signal from a specific terminal among said plurality of terminals, based on signals from said plurality of antennas, when a reception signal is received, and a reception propagation path estimating circuit estimating a propagation path from said specific terminal based on signals from said plurality of antennas, when said reception signal is received;

said transmission circuit includes a transmission propagation path estimating circuit predicting a propagation path when a transmission signal is transmitted, based on a result of estimation by said reception propagation path estimating circuit, and a transmission directivity control circuit updating said antenna directivity when said transmission signal is transmitted, based on the result of estimation by said transmission propagation path estimating circuit; wherein said reception signal separating circuit includes a reception weight vector calculating unit receiving reception signals from said plurality of antennas and providing, on real time basis, a reception weight vector for separating a signal from said specific terminal, a plurality of first multipliers each receiving at one input the reception signals from said plurality of antennas respectively and receiving corresponding element of said reception weight vector at the other input, and an adder adding signals from said plurality of multipliers;

said transmission directivity control circuit includes a moving speed determining unit determining speed of movement of said specific terminal based on a result of estimation by said reception propagation path estimating circuit, a transmission weight vector calculating unit providing a transmission weight vector based on a result of estimation by said transmission propagation path estimating circuit, a switching circuit receiving said transmission weight vector and said reception weight vector, and selectively outputting in accordance with a result of determination by said moving speed determining unit, and a plurality of second multipliers receiving at one input a transmission signal and receiving an output of said switching circuit at the other input respectively, and applying to said plurality of antennas, respectively.

18. A radio equipment changing antenna directivity on real time basis and transmitting/receiving signals time divisionally to/from a plurality of terminals, comprising:

a plurality of antennas arranged in a discrete manner; and a transmission circuit and a reception circuit sharing said plurality of antennas for transmitting/receiving signals; wherein said reception circuit includes a reception signal separating circuit for separating a signal from a specific terminal among said plurality of terminals, based on signals from said plurality of antennas, when a reception signal is received, and a reception propagation path estimating circuit estimating a propagation path from said specific terminal based on signals from said plurality of antennas, when said reception signal is received;

said transmission circuit includes a transmission propagation path estimating circuit predicting a propagation path when a transmission signal is transmitted, based on a result of estimation by said reception propagation path estimating circuit, and a transmission directivity control circuit updating said antenna directivity when said transmission signal is transmitted, based on the result of estimation by said transmission propagation path estimating circuit; wherein the reception signal separating circuit includes a reception weight vector calculating unit receiving reception signals from said plurality of antennas and providing, on real time basis, a reception weight vector for separating a signal from said specific terminal, a reception signal level operating unit receiving the reception signals from said plurality of antennas and providing a reception level of the signal from said specific terminal, a plurality of first multipliers receiving at an input the reception signals from said plurality of antennas respectively, and receiving corresponding elements of said reception weight vector at the other input respectively, and an adder adding the signals from said plurality of multiplying units; and said transmission directivity control circuit includes a reception signal level determining unit determining a reception signal level of said specific terminal based on a result of operation of said reception signal level operating unit, a transmission weight vector calculating unit providing a transmission weight vector based on a result of estimation by said transmission propagation path estimating circuit, a switching circuit receiving said transmission weight vector and said reception weight vector and selectively outputting in accordance with a result of determination by said reception signal level determining unit, and a plurality of multipliers receiving at one input the transmission signal and receiving an output of said switching circuit at the other input respectively, and providing to said plurality of antennas, respectively.

* * * * *